United States Patent
Wu et al.

(10) Patent No.: US 12,155,591 B2
(45) Date of Patent: Nov. 26, 2024

(54) RESERVATION BASED SIDELINK REFERENCE SIGNAL TRANSMISSION FOR POSITIONING

(71) Applicant: QUALCOMM Incorporated, San Diego, CA (US)

(72) Inventors: Shuanshuan Wu, San Diego, CA (US); Dan Vassilovski, Del Mar, CA (US); Kapil Gulati, Belle Mead, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 17/339,878

(22) Filed: Jun. 4, 2021

(65) Prior Publication Data

US 2022/0393814 A1 Dec. 8, 2022

(51) Int. Cl.
*H04L 5/00* (2006.01)
*H04W 4/029* (2018.01)
*H04W 72/20* (2023.01)
*H04W 74/0808* (2024.01)

(52) U.S. Cl.
CPC .......... *H04L 5/0048* (2013.01); *H04W 4/029* (2018.02); *H04W 72/20* (2023.01); *H04W 74/0808* (2013.01)

(58) Field of Classification Search
None
See application file for complete search history.

(56) References Cited

U.S. PATENT DOCUMENTS

| | | | |
|---|---|---|---|
| 2004/0000881 A1* | 1/2004 | Flory, IV | H05B 41/36 315/318 |
| 2006/0121854 A1* | 6/2006 | Abhishek | H04W 16/10 455/434 |
| 2017/0202043 A1* | 7/2017 | Seo | H04W 16/14 |
| 2017/0251442 A1 | 8/2017 | Kalhan | |
| 2018/0054792 A1* | 2/2018 | Lee | H04B 17/24 |
| 2019/0302220 A1* | 10/2019 | Kumar | H04W 4/44 |
| 2020/0022116 A1* | 1/2020 | Liu | H04W 88/18 |
| 2022/0416976 A1 | 12/2022 | Baek et al. | |

* cited by examiner

*Primary Examiner* — Alpus Hsu
*Assistant Examiner* — Camquyen Thai
(74) *Attorney, Agent, or Firm* — Holland & Hart LLP

(57) ABSTRACT

Methods, systems, and devices for wireless communications are described. A UE may determine a set of resources available for transmission of one or more reference signals (e.g., one or more PRSs) in a shared radio frequency spectrum band (e.g., an unlicensed radio frequency spectrum band) in a time interval for sidelink positioning. The UE may transmit, in a second radio frequency spectrum, a control message reserving the set of resources for the UE to transmit the one or more reference signals in the time interval for sidelink positioning. The UE may transmit the one or more reference signals on the set of resources based on transmitting the control message reserving the set of resources.

30 Claims, 13 Drawing Sheets

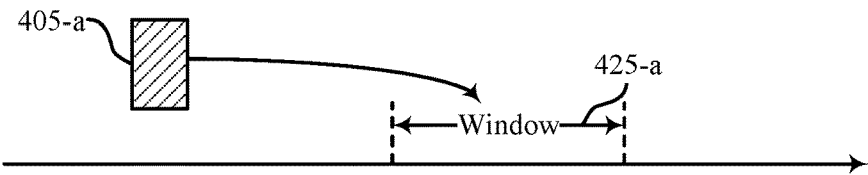
FIG. 4A
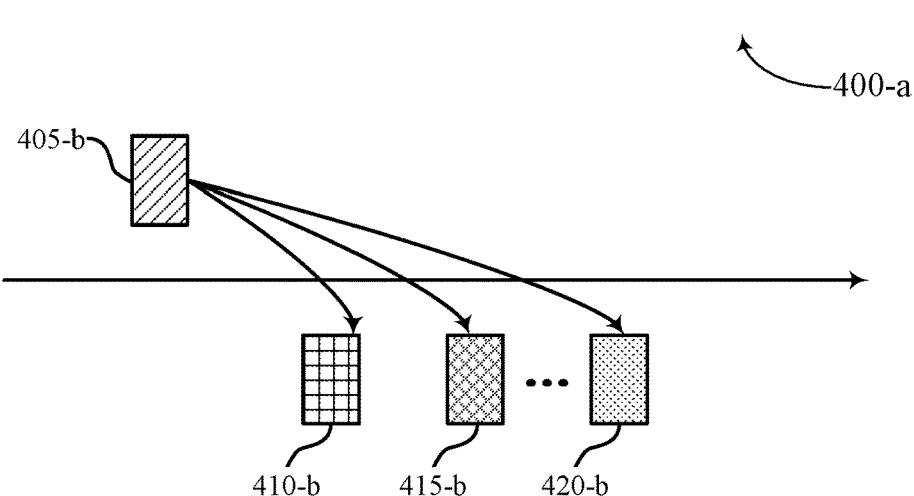
FIG. 4B
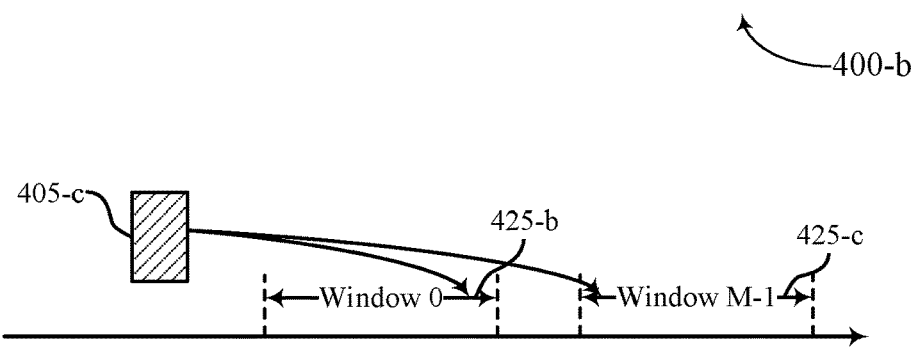
FIG. 4C
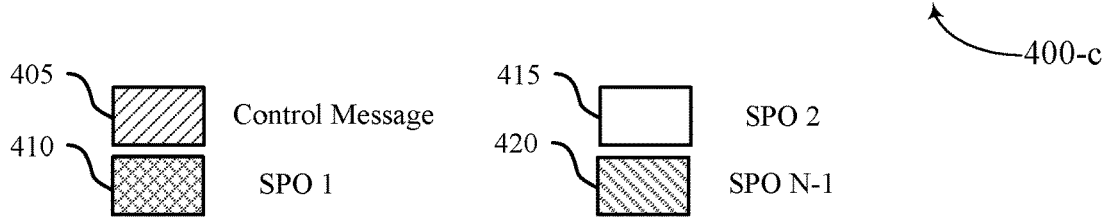

RESERVATION BASED SIDELINK REFERENCE SIGNAL TRANSMISSION FOR POSITIONING

FIELD OF TECHNOLOGY

The following relates to wireless communications, including reservation based sidelink reference signal transmission for positioning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support reservation based sidelink reference signal transmission for positioning. Generally, the described techniques provide for a user equipment (UE) to resolve uncertainty associated with a positioning reference signal (PRS) transmission and/or to mitigate or reduce transmission collisions. For instance, a UE may determine a set of resources available for transmission of one or more reference signals (e.g., one or more PRSs) in a shared radio frequency spectrum band (e.g., an unlicensed radio frequency spectrum band) in a time interval for sidelink positioning. The UE may transmit, in a second radio frequency spectrum, a control message reserving the set of resources for the UE to transmit the one or more reference signals in the time interval for sidelink positioning. The UE may transmit the one or more reference signals on the set of resources based on transmitting the control message reserving the set of resources.

A method for wireless communication at a user equipment (UE) is described. The method may include determining a set of resources available for transmission of one or more reference signals in a shared radio frequency spectrum band in a time interval for sidelink positioning, transmitting, in a second radio frequency spectrum band, a control message reserving the set of resources for the UE to transmit the one or more reference signals in the time interval for sidelink positioning, and transmitting the one or more reference signals on the set of resources based on transmitting the control message reserving the set of resources.

An apparatus for wireless communication at a UE is described. The apparatus may include a processor, memory coupled with the processor, and instructions stored in the memory. The instructions may be executable by the processor to cause the apparatus to determine a set of resources available for transmission of one or more reference signals in a shared radio frequency spectrum band in a time interval for sidelink positioning, transmit, in a second radio frequency spectrum band, a control message reserving the set of resources for the UE to transmit the one or more reference signals in the time interval for sidelink positioning, and transmit the one or more reference signals on the set of resources based on transmitting the control message reserving the set of resources.

Another apparatus for wireless communication at a UE is described. The apparatus may include means for determining a set of resources available for transmission of one or more reference signals in a shared radio frequency spectrum band in a time interval for sidelink positioning, means for transmitting, in a second radio frequency spectrum band, a control message reserving the set of resources for the UE to transmit the one or more reference signals in the time interval for sidelink positioning, and means for transmitting the one or more reference signals on the set of resources based on transmitting the control message reserving the set of resources.

A non-transitory computer-readable medium storing code for wireless communication at a UE is described. The code may include instructions executable by a processor to determine a set of resources available for transmission of one or more reference signals in a shared radio frequency spectrum band in a time interval for sidelink positioning, transmit, in a second radio frequency spectrum band, a control message reserving the set of resources for the UE to transmit the one or more reference signals in the time interval for sidelink positioning, and transmit the one or more reference signals on the set of resources based on transmitting the control message reserving the set of resources.

Some examples of the method, apparatuses, and non-transitory computer-readable medium described herein may further include operations, features, means, or instructions for receiving, from a second UE, a second control message reserving a second set of resources for the second UE to transmit one or more second reference signals in the shared radio frequency spectrum band, where determining the set of resources available for transmission of the one or more reference signals may be based on the second set of resources for the second UE reserved by the second control message.

In some examples of the method, apparatuses, and non-transitory computer-readable medium described herein, transmitting the control message may include operations, features, means, or instructions for transmitting the control message identifying a time window that includes the set of resources within the time interval.

In some examples of the method, apparatuses, and non-transitory computer-readable medium described herein, transmitting the control message identifying the time window may include operations, features, means, or instructions for transmitting the control message identifying a start time and a duration of the time window.

In some examples of the method, apparatuses, and non-transitory computer-readable medium described herein, transmitting the control message identifying the time window may include operations, features, means, or instructions for transmitting the control message identifying a number of slots or a number of symbols associated with the time window.

In some examples of the method, apparatuses, and non-transitory computer-readable medium described herein, each resource of the set of resources may be contiguous with at least one other resource of the set of resources.

In some examples of the method, apparatuses, and non-transitory computer-readable medium described herein, transmitting the control message may include operations, features, means, or instructions for transmitting the control message further reserving a second set of resources for the UE to transmit the one or more reference signals for sidelink positioning on at least one resource of the set of resources and at least one resource of the second set of resources.

In some examples of the method, apparatuses, and non-transitory computer-readable medium described herein, transmitting the control message may include operations, features, means, or instructions for transmitting the control message identifying a first time window that includes the set of resources and a second time window that includes the second set of resources, where the first time window and the second time window may be within the time interval.

In some examples of the method, apparatuses, and non-transitory computer-readable medium described herein, transmitting the control message may include operations, features, means, or instructions for transmitting the control message indicating a period, where the set of resources may be spaced relative to the second set of resources according to the period.

In some examples of the method, apparatuses, and non-transitory computer-readable medium described herein, transmitting the one or more reference signals may include operations, features, means, or instructions for transmitting a first reference signal on a first resource of the set of resources and transmitting a second reference signal on a second resource of the second set of resources.

In some examples of the method, apparatuses, and non-transitory computer-readable medium described herein, transmitting the control message may include operations, features, means, or instructions for transmitting the control message identifying a period for the set of resources.

Some examples of the method, apparatuses, and non-transitory computer-readable medium described herein may further include operations, features, means, or instructions for performing at least one listen-before-talk procedure in the shared radio frequency spectrum band for the set of resources, where transmitting the one or more reference signals may be based on performing the at least one listen-before-talk procedure.

In some examples of the method, apparatuses, and non-transitory computer-readable medium described herein, the control message may be transmitted via sidelink shared channel signaling, radio resource control signaling, medium access control (MAC) control element signaling, or sidelink control information signaling.

In some examples of the method, apparatuses, and non-transitory computer-readable medium described herein, the shared radio frequency spectrum band includes an unlicensed radio frequency spectrum band, and the second radio frequency spectrum band includes a licensed radio frequency spectrum band.

A method for wireless communication at a first UE is described. The method may include receiving, from a second UE in a second radio frequency spectrum band, a control message reserving a set of resources for the second UE to transmit one or more reference signals in an shared radio frequency spectrum band in a time interval for sidelink positioning and receiving, from the second UE, the one or more reference signals on the set of resources based on receiving the control message reserving the set of resources.

An apparatus for wireless communication at a first UE is described. The apparatus may include a processor, memory coupled with the processor, and instructions stored in the memory. The instructions may be executable by the processor to cause the apparatus to receive, from a second UE in a second radio frequency spectrum band, a control message reserving a set of resources for the second UE to transmit one or more reference signals in an shared radio frequency spectrum band in a time interval for sidelink positioning and receive, from the second UE, the one or more reference signals on the set of resources based on receiving the control message reserving the set of resources.

Another apparatus for wireless communication at a first UE is described. The apparatus may include means for receiving, from a second UE in a second radio frequency spectrum band, a control message reserving a set of resources for the second UE to transmit one or more reference signals in an shared radio frequency spectrum band in a time interval for sidelink positioning and means for receiving, from the second UE, the one or more reference signals on the set of resources based on receiving the control message reserving the set of resources.

A non-transitory computer-readable medium storing code for wireless communication at a first UE is described. The code may include instructions executable by a processor to receive, from a second UE in a second radio frequency spectrum band, a control message reserving a set of resources for the second UE to transmit one or more reference signals in an shared radio frequency spectrum band in a time interval for sidelink positioning and receive, from the second UE, the one or more reference signals on the set of resources based on receiving the control message reserving the set of resources.

In some examples of the method, apparatuses, and non-transitory computer-readable medium described herein, receiving the control message may include operations, features, means, or instructions for receiving the control message identifying a time window that includes the set of resources within the time interval.

In some examples of the method, apparatuses, and non-transitory computer-readable medium described herein, receiving the control message identifying the time window may include operations, features, means, or instructions for receiving the control message identifying a start time and a duration of the time window.

In some examples of the method, apparatuses, and non-transitory computer-readable medium described herein, receiving the control message identifying the time window may include operations, features, means, or instructions for receiving the control message identifying a number of slots or a number of symbols associated with the time window.

In some examples of the method, apparatuses, and non-transitory computer-readable medium described herein, each resource of the set of resources may be contiguous with at least one other resource of the set of resources.

In some examples of the method, apparatuses, and non-transitory computer-readable medium described herein, receiving the control message may include operations, features, means, or instructions for receiving the control message further reserving a second set of resources for the UE to transmit the one or more reference signals for sidelink positioning on at least one resource of the set of resources and at least one resource of the second set of resources.

In some examples of the method, apparatuses, and non-transitory computer-readable medium described herein, receiving the control message may include operations, features, means, or instructions for receiving the control message identifying a first time window that includes the set of resources and a second time window that includes the second set of resources, where the first time window and the second time window may be within the time interval.

In some examples of the method, apparatuses, and non-transitory computer-readable medium described herein, receiving the control message may include operations, features, means, or instructions for receiving the control message indicating a period, where the set of resources may be spaced relative to the second set of resources according to the period.

In some examples of the method, apparatuses, and non-transitory computer-readable medium described herein, receiving the one or more reference signals may include operations, features, means, or instructions for receiving a first reference signal on a first resource of the set of resources and receiving a second reference signal on a second resource of the second set of resources.

In some examples of the method, apparatuses, and non-transitory computer-readable medium described herein, receiving the control message may include operations, features, means, or instructions for receiving the control message identifying a period for the set of resources.

BRIEF DESCRIPTION OF THE DRAWINGS

FIGS. 4A, 4B, and 4C illustrate examples of resource reservation schemes that support reservation based sidelink reference signal transmission for positioning in accordance with aspects of the present disclosure.

DETAILED DESCRIPTION

Figure 1:
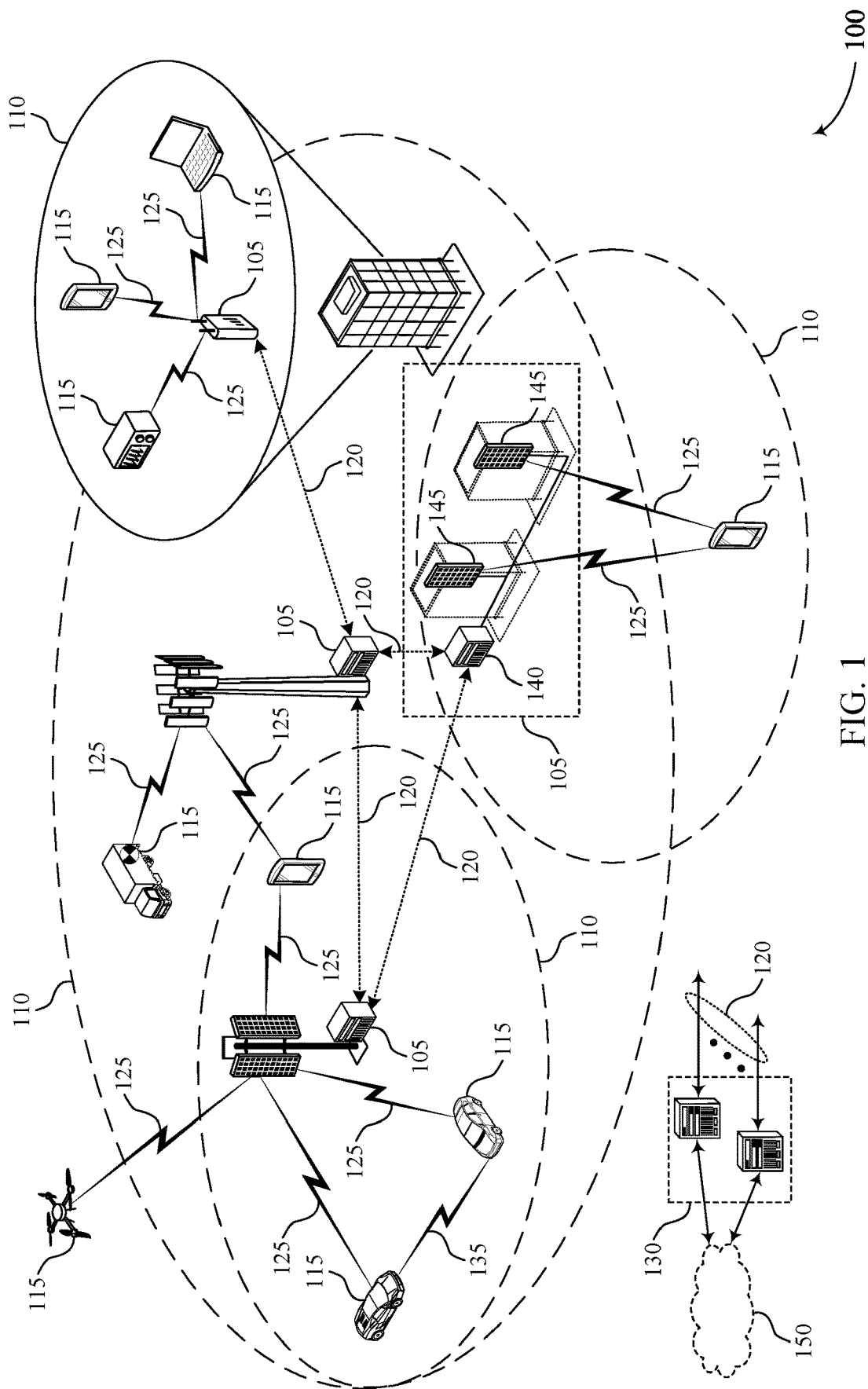
FIG. 1 illustrates an example of a wireless communications system that supports reservation based sidelink reference signal transmission for positioning in accordance with aspects of the present disclosure.

A first user equipment (UE) may perform sidelink positioning with a second UE in a first radio frequency spectrum band (e.g., a licensed radio frequency spectrum band), in which the first UE transmits a first positioning reference signal (PRS) to the second UE and the second UE transmits a second PRS to the first UE in response to the first PRS. The first UE may determine a positioning of the second UE based on a timing associated with the first PRS and the second PRS. In some examples, the first UE may have a constraint indicating that an accuracy of the positioning is to be above a threshold amount. As the threshold amount increases, the bandwidth over which the first UE transits the PRS for positioning to satisfy that threshold amount may also increase. If the bandwidth increases above a threshold amount, the bandwidth may be larger than what may be available in the first radio frequency spectrum band.

Accordingly, the first UE may communicate the sidelink PRS over a second radio frequency spectrum band (e.g., a shared radio frequency spectrum band, such as an unlicensed radio frequency spectrum band) in which the first UE may have more availability to use a larger bandwidth for transmitting a sidelink PRS than the first radio frequency spectrum band. However, the first UE may be constrained to perform a listen-before-talk (LBT) procedure in the second radio frequency spectrum band before transmitting the sidelink PRS. Due to this constraint, the sidelink PRS transmitted from the first UE may enable an LBT procedure of another UE to fail. Additionally, the first UE may not determine, prior to performing the LBT procedure, whether the LBT procedure may succeed. Thus, uncertainty may be present as to when the first UE may succeed an LBT procedure in a given transmission opportunity. Such uncertainty may enable the sidelink PRS to collide with transmissions from other wireless devices (e.g., other UEs) and may also result in a receiving UE being unable to determine when the receiving UE is to receive the sidelink PRS from the first UE.

The methods described in the present disclosure may enable the first UE to resolve the uncertainty, to prevent or lower a likelihood of the sidelink PRS from the first UE interfering with transmissions from other wireless devices or resulting in failure for an LBT procedure for another UE. For instance, the first UE may determine a set of resources available for transmission of the sidelink PRS in the second radio frequency spectrum band in a time interval and may transmit, in the first radio frequency spectrum band, a control message reserving the set of resources for the first UE to transmit the sidelink PRS in the time interval. The first UE may transmit the first PRS on the set of resources based on transmitting the control message. By reserving the set of resources via the control message, the second UE may identify that the control message may be received over one of the set of resources and the uncertainty may be resolved. Additionally, each UE that receives the control message may avoid selecting the resources indicated in the control message, which may mitigate the likelihood of a collision.

Aspects of the disclosure are initially described in the context of wireless communications systems. Additional aspects of the disclosure are described in the context of resource reservation schemes and a process flow. Aspects of the disclosure are further illustrated by and described with reference to apparatus diagrams, system diagrams, and flowcharts that relate to reservation based sidelink reference signal transmission for positioning.

FIG. 1 illustrates an example of a wireless communications system 100 that supports reservation based sidelink reference signal transmission for positioning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, UEs 115 may perform sidelink communications (e.g., vehicle to vehicle (V2V), vehicle to everything (V2X) communications). The sidelink communications may occur in a licensed radio frequency spectrum band. Additionally, a number of sidelink signal and/or physical cannels may be used for transmission in a cellular radio frequency spectrum band (e.g., a sidelink sharing radio frequency spectrum band in a licensed cellular band) or in a dedicated intelligent transportation system (ITS) radio frequency spectrum band.

In some examples, UEs 115 may use sidelink positioning. The UEs 115 may perform sidelink positioning for V2X communications or for applications associated with public safety or commercial use. In some examples, sidelink positioning may be performed based on a UE 115 measuring a positioning reference signal (PRS) transmitted over a sidelink. The positioning may be based on measurements of time-of-arrival (ToA), time-difference-on-arrival (TDoA), angle-of-arrival (AoA), round trip time (RTT), or any combination thereof of the sidelink PRS. In some examples, how accurate a UE 115 determines positioning may depend at least partially on how large of a bandwidth the UE 115 uses for communicating a PRS. In some examples, a UE 115 may have a constraint according to which it operates that indicates that an accuracy of positioning is to be above a threshold amount (e.g., the accuracy is to be within a sub-meter level). As the threshold amount increases, the bandwidth the UE 115 is to use for measuring the sidelink PRS may also increase (e.g., to 100 MHz or more). If the bandwidth increases above a threshold amount, the bandwidth may be larger than what may be available in a licensed and/or ITS radio frequency spectrum band.

In order to enable the UE 115 to communicate a sidelink PRS over an increase bandwidth, the UE may communicate the sidelink PRS in an shared radio frequency spectrum band (e.g., an unlicensed radio frequency spectrum band). However, wireless devices communicating in the shared radio frequency spectrum band may share the radio frequency spectrum band with other wireless devices that may communicate according to the same radio access technology or different radio access technologies. Additionally, wireless devices communicating in the shared radio frequency spectrum band may have one or more constraints according to which they may operate. For instance, such wireless devices may perform listen-before-talk (LBT), which may be a procedure in which the wireless device senses (e.g., listens) the radio frequency spectrum band before transmitting (e.g., talking). When sidelink PRS is transmitted in the shared radio frequency spectrum band, the transmission opportunity (e.g., the time resource location over which the sidelink PRS is transmitted) may not be identified by the UE 115 due to uncertainty associated with LBT. For instance, the UE 115 transmitting the sidelink PRS may transmit the sidelink PRS when the UE 115 succeeds at performing LBT, but the time at which the UE 115 may successfully perform LBT may not be identified at the UE prior to performing LBT.

In some examples, a sidelink PRS transmission may be used for ranging between UEs 115. For instance, ranging may be performed in a RTT manner in which a first UE 115 transmits a first PRS at a first time. A second UE 115 may receive the first PRS at a second time and may transmit a second PRS to the first UE 115 at a third time. The first UE 115 may receive the first PRS at a fourth time. The propagation delay between the first and second UEs 115 may be determined from the timings (e.g., the first, second, third, and fourth time) and the range between the first and second UEs 115 may be determined based on the propagation delay. In some examples, a sidelink PRS transmission may be used for positioning of a UE 115. For instance, TDoA may be determined based on positioning. For instance, a UE 115 may be able to measure TDoA based on a PRS transmitted by multiple roadside units (RSU) or UEs with identified locations, which may be referred to as anchors. The measured TDoA as well as a location of the anchors may be used to triangulate a location of a UE 115.

A first UE 115 may perform sidelink positioning with a second UE 115 in a first radio frequency spectrum band (e.g., a licensed radio frequency spectrum band), in which the first UE 115 transmits a first positioning reference signal (PRS) to the second UE 115 and the second UE 115 transmits a second PRS to the first UE 115 in response to the first PRS. The first UE 115 may determine a positioning of the second UE 115 based on a timing associated with the first PRS and the second PRS. In some examples, the first UE 115 may have a constraint indicating that an accuracy of the positioning is to be above a threshold amount. As the threshold amount increases, the bandwidth over which the first UE 115 transits the PRS for positioning to satisfy that threshold amount may also increase. If the bandwidth increases above a threshold amount, the bandwidth may be larger than what may be available in the first radio frequency spectrum band.

Accordingly, the first UE 115 may communicate the sidelink PRS over a second radio frequency spectrum band (e.g., a shared radio frequency spectrum band) in which the first UE 115 may have more availability to use a larger bandwidth for transmitting a sidelink PRS than the first radio frequency spectrum band. However, the first UE 115 may be constrained to perform a listen-before-talk (LBT) procedure in the second radio frequency spectrum band before transmitting the sidelink PRS. Due to this constraint, the sidelink PRS transmitted from the first UE 115 may enable an LBT procedure of another UE 115 to fail. Additionally, the first UE 115 may not determine, prior to performing the LBT procedure, whether the LBT procedure may succeed. Thus, uncertainty may be present as to when the first UE 115 may succeed an LBT procedure in a given transmission opportunity. Such uncertainty may enable the sidelink PRS to collide with transmissions from other wireless devices (e.g., other UEs 115) and may also result in a receiving UE 115 being unable to determine when the receiving UE 115 is to receive the sidelink PRS from the first UE 115.

The methods described in the present disclosure may enable the first UE 115 to resolve the uncertainty, to prevent or lower a likelihood of the sidelink PRS from the first UE 115 interfering with transmissions from other wireless devices or resulting in failure for an LBT procedure for another UE 115. For instance, the first UE 115 may determine a set of resources available for transmission of the sidelink PRS in the second radio frequency spectrum band in a time interval and may transmit, in the first radio frequency spectrum band, a control message reserving the set of resources for the first UE 115 to transmit the sidelink PRS in the time interval. The first UE 115 may transmit the first PRS on the set of resources based on transmitting the control message. By reserving the set of resources via the control message, the second UE 115 may identify that the control message may be received over one of the set of resources and the uncertainty may be resolved. Additionally, each UE 115 that receives the control message may avoid selecting the resources indicated in the control message, which may mitigate the likelihood of a collision.

Figure 2:
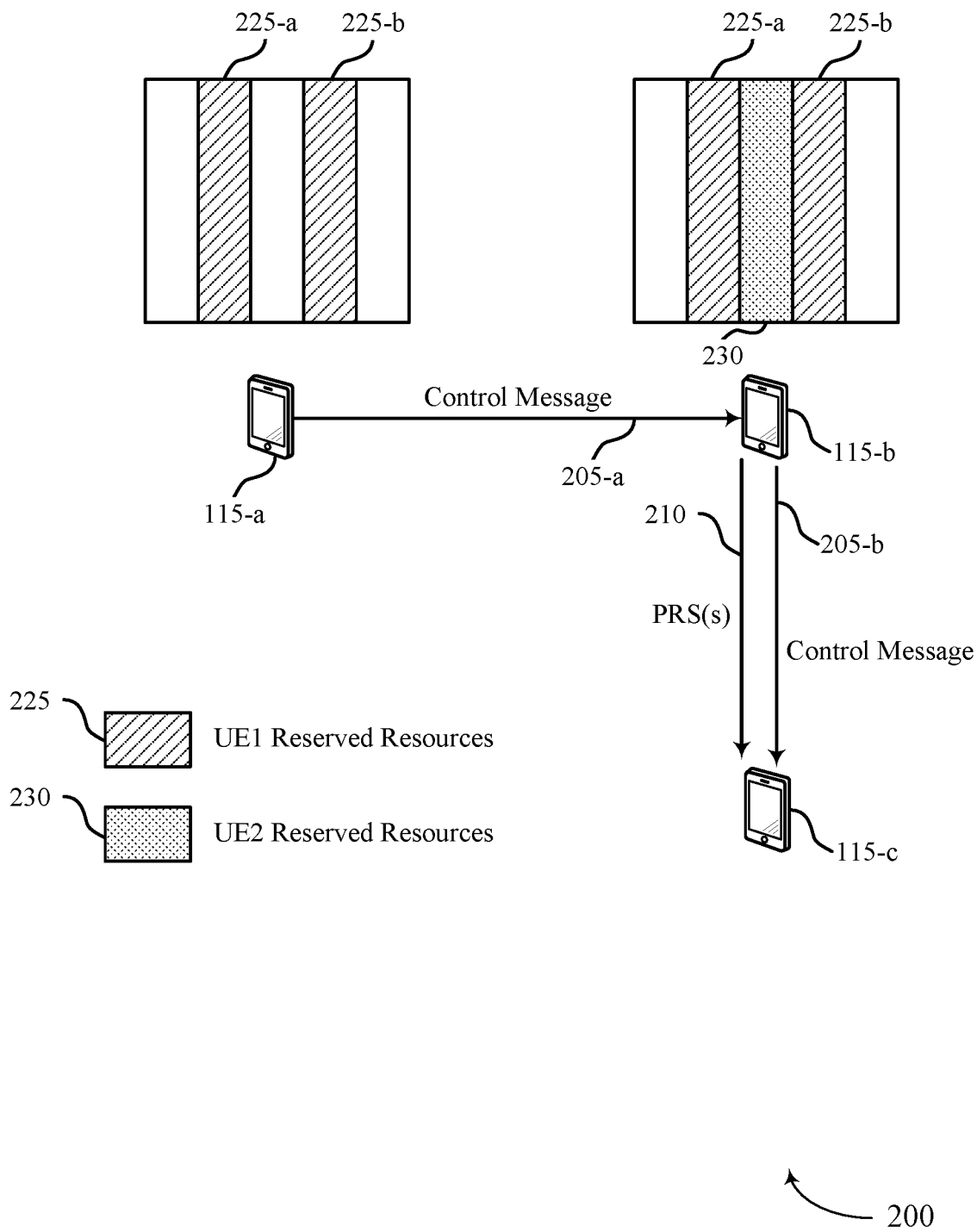
FIG. 2 illustrates an example of a wireless communications system that supports reservation based sidelink reference signal transmission for positioning in accordance with aspects of the present disclosure.

FIG. 2 illustrates an example of a wireless communications system 200 that supports reservation based sidelink reference signal transmission for positioning in accordance with aspects of the present disclosure. In some examples, wireless communications system 200 may implement one or more aspects of wireless communications system 100. For instance, UEs 115-*a*, 115-*b*, and 115-*c* may each be examples of one or more aspects of a UE 115 as described with reference to FIG. 1.

UE 115-*b* may perform sidelink positioning with UE 115-*c* in a first radio frequency spectrum band (e.g., a licensed radio frequency spectrum band), in which the UE 115-*b* transmits a PRS 210 to UE 115-*c*. In some examples, due to one or more constraints (e.g., a constraint indicating that an accuracy of the positioning is to be above a threshold amount), UE 115-*b* may determine to transmit the PRS 210 in a second radio frequency spectrum band (e.g., a shared radio frequency spectrum band). To communicate in the second radio frequency spectrum band, UE 115-*b* may perform an LBT procedure before transmitting the PRS 210.

Transmitting the PRS 210 when performing an LBT procedure may present one or more challenges. For instance, when multiple UEs 115 (e.g., RSUs, vehicle UEs 115, including UEs incorporated into vehicles and UEs colocated with a vehicle, pedestrian UEs 115) are transmitting a sidelink PRS for sidelink positioning in the second radio frequency spectrum band, collisions between the sidelink PRSs may occur. For instance, if LBT is performed for a PRS transmission at a first UE 115, the PRS transmission may block an LBT attempt of a second UE 115 which may decrease an LBT success probability for the second UE 115. Additionally, it is possible that a first UE 115 may be transmitting a PRS at a same or overlapping time resources, which may affect PRS detection or measurement at a second UE 115. Additionally, the PRS transmission may have uncertainty. For instance, a time location for communicating the PRS transmission may be uncertain due to LBT. Such uncertainty may affect a timing determination and/or a timing measurement in sidelink PRS-based positioning.

The methods described in the present disclosure may enable UEs 115-*a*, 115-*b*, and 115-*c* to resolve the uncertainty, to prevent or lower a likelihood of the PRS 210 from UE 115-*b* interfering with transmissions from other wireless devices or resulting in failure for an LBT procedure for another UE 115. For instance, a UE 115 that intends to transmit sidelink PRS may reserve a PRS transmission occasion (which may be referred to as a sidelink PRS occasion (SPO)) in the second radio frequency spectrum band. The UE 115 may transmit a control message in a difference radio frequency spectrum band than the second radio frequency spectrum band (e.g., the first radio frequency spectrum band, which may be a licensed radio frequency spectrum band and/or an ITS radio frequency spectrum band). In some examples, the control message may be referred to as a sidelink positioning assistance message, positioning assistance message, positioning control message, and so on, though other names may be used for the control message. The control message may also include the same information and signaling as described herein, but incorporated into other control messages, including other sidelink control messages, consistent with the present disclosure. In some examples, the control message may include a payload and/or signaling used at least for indicating PRS resource reservation in the second radio frequency spectrum band.

In one example, UE 115-*a* may reserve resources 225-*a* and 225-*b* (e.g., for a sidelink PRS transmission), which may be examples of SPOs as described herein, and may provide an indication of resources 225-*a* and 225-*b* to UE 115-*b* via control message 205-*a*. UE 115-*b* may identify, based on control message 205-*a*, that UE 115-*a* has reserved resources 225-*a* and 225-*b* and may select a resource 230 for transmitting a PRS 210 that is different than resource 225-*a* and 225-*b* (e.g., UE 115-*b* may avoid resources that have already been selected). UE 115-*b* may provide an indication of resource 230 to UE 115-*c* and/or one or more other UEs 115 via control message 205-*b*. Additionally or alternatively, UE 115-*b* may transmit, to UE 115-*c*, a PRS 210 over resource 230 (e.g., after or based on transmitting control message 205-*b*).

In some examples, the UE 115 may transmit the PRS 210 in the reserved PRS occasions based on a CAT2 or CAT4 LBT (e.g., energy sensing is performed prior to PRS transmission in the second radio frequency spectrum band) or based on a CAT1 LBT (e.g., energy sensing may not be performed or may be performed optionally prior to PRS transmission), which may be based on a configuration or pre-configuration, a constraint (e.g., a regulation), or a PRS duty cycle indicated by the UE 115. For the PRS resource reservation, each PRS reservation may include multiple SPOs. For instance, each control message may indicate a contiguous window of SPOs (e.g., as described with reference to FIG. 4A), a set of periodic SPOs (e.g., as described with reference to FIG. 4B), or a set of multiple (e.g., periodic) SPO windows (e.g., as described with reference to FIG. 4C).

The assistance message used for a sidelink PRS occasion reservation may be used for SPO reservation and may be transmitted in the first radio frequency spectrum band. In some examples, the first radio frequency spectrum band may be a licensed radio frequency spectrum band (e.g., for sharing resources in a cellular spectrum) or an ITS radio frequency spectrum band used for sidelink communication (e.g., for V2X communication). The control message used for SPO reservation may be transmitted by a UE 115 over sidelink in the first frequency spectrum band. In some examples, the control message may be transmitted in a sidelink data channel (e.g., physical sidelink shared channel). In some examples, the control message may be transmitted via MAC-CE signaling or RRC signaling.

In some examples, a UE 115 may receive and decode sidelink transmissions in the first radio frequency spectrum band for SPO reservation from other UEs 115 before reserving SPOs for its own sidelink PRS transmission. For instance, UE 115-*b* may receive and decode control message 205-*a* from UE 115-*a* before reserving SPOs for transmitting PRS 210 to UE 115-*c*. The UE 115 may identify the resources in the second radio frequency spectrum band that have not been reserved by other UEs 115 (e.g., available resources) based on decoded SPO reservations and may select one or more resources from the identified available resources for its SPO reservation. The UE 115 may transmit the control message in the first radio frequency spectrum band to indicate the SPO reservation (e.g., the UE 115 may transmit the control message to indicate and/or reserve SPOs that have not been reserved by other UEs 115).

In some examples, each SPO may have one or more OFDM symbols. For example, a time duration of an SPO may be the same as that of a slot (e.g., 14 OFDM symbols). The duration of a sidelink PRS occasion may be configurable. For instance, the duration may be pre-configured or configured by another UE 115, so that reservation signal indicates the duration of an SPO. In some examples, retransmission of a reservation signal (e.g., control message) may be supported. For instance, a UE 115 may transmit a control message multiple times, which may improve performance (e.g., may improve the likelihood that the control message is received). Thus, it may be less likely that other UEs 115 detecting PRS or detecting PRS reservation (e.g., via a control message) will fail to detect the control message. In a sidelink PRS occasion (e.g., an SPO), the UE 115 may transmit a sidelink PRS and/or may transmit other signals (e.g., a control message).

In some examples, performing the methods described herein may have one or more advantages. For instance, communicating the control message may enable PRS transmission to occur in the second radio frequency spectrum band, which may have improved performance relative to the PRS transmission in the first radio frequency spectrum band due to having access to a larger PRS bandwidth. Additionally or alternatively, the reservation-based PRS transmission may mitigate PRS collisions when sidelink communication is in a distributed manner. Additionally, the proposed SPO configuration may reduce PRS transmission (e.g., due to LBT) and/or may improve probability of PRS transmission success.

Figure 3:
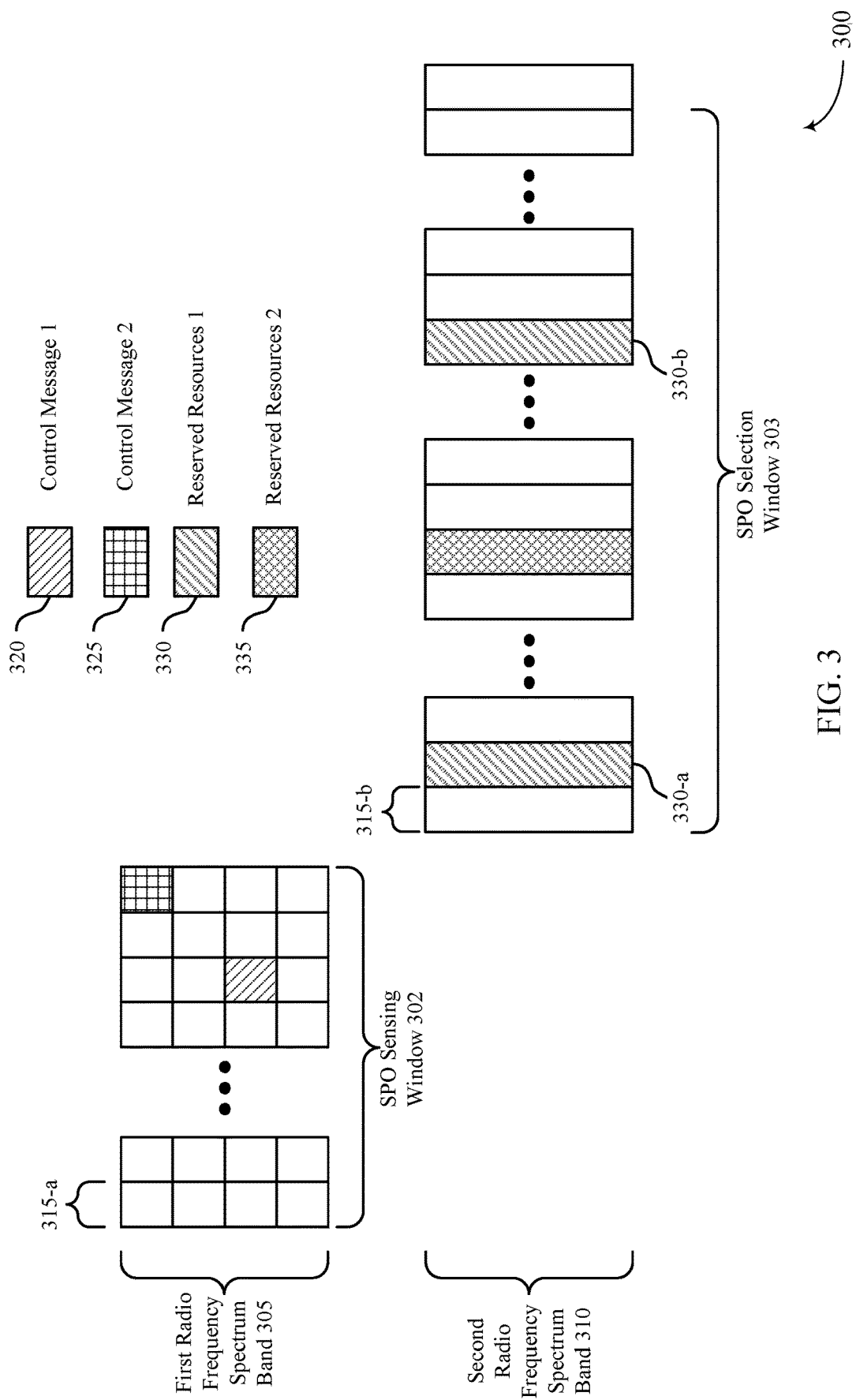
FIG. 3 illustrates an example of a resource reservation scheme that supports reservation based sidelink reference signal transmission for positioning in accordance with aspects of the present disclosure.

FIG. 3 illustrates an example of a resource reservation scheme 300 that supports reservation based sidelink reference signal transmission for positioning in accordance with aspects of the present disclosure. In some examples, resource reservation scheme 300 may be implemented by a first UE 115 and a second UE 115 as described with reference to FIG. 1.

In some examples, SPO reservation or a PRS transmission may be triggered at a first UE 115. The first UE 115 may check an SPO sensing window 302, during which the UE 115 may have decoded control messages (e.g., sidelink positioning assistance messages) from other UEs 115. For instance, in the present example, the first UE 115 may identify that it has decoded a first control message 320 during a first time interval 315-*a* (e.g., slot, symbol) of the SPO sensing window 302 and may identify that it has decoded a second control message 325 during a second time interval 315-*a* of the SPO sensing window 302. Based on the SPO reservation indicated by the decoded control messages, the UE 115 may be able to identify available resources in an SPO selection window 303. For instance, control message 320 may indicate reserved resource 330-*a* (e.g., an SPO) within a first time interval 315-*b* (e.g., slot, symbol) of the SPO selection window 303 and may indicate reserved resource 330-*b* within a second time interval 315-*b* of the SPO selection window 303. Additionally, control message 325 may indicate reserved resource 335 within a third time interval 315-*b* of the SPO selection window 303. The UE 115 may select SPOs from available resources in the SPO selection window 303 (e.g., resources in any time interval 315-*b* besides the time intervals 315-*b* including resources 330-*a*, 330-*b*, and 335).

For a reservation-based PRS, collision of PRS from different UEs 115 may be reduced, mitigated, or eliminated, even if examples in which the UEs 115 may be operating in a distributed manner. Additionally, the SPO sensing window 302 may be located within a first radio frequency spectrum band 305 (e.g., a licensed and/or ITS radio frequency spectrum band) and the SPO selection window 303 may be located within a second radio frequency spectrum band 310 (e.g., a shared radio frequency band).

FIGS. 4A, 4B, and 4C illustrate examples of resource reservation schemes 400-*a*, 400-*b*, and 400-*c* that support reservation based sidelink reference signal transmission for positioning in accordance with aspects of the present disclosure. In some examples, resource reservation schemes 400-*a*, 400-*b*, and 400-*c* may be implemented by one or more UEs 115 as described with reference to FIG. 1.

In FIG. 4A, a UE 115 may transmit a control message 405-*a* indicating an SPO window 425-*a* that includes a set of SPOs. For instance, SPO window 425-*a* may include SPO 410-*a*, SPO 415-*a*, and SPO 420-*a*. In some examples, the reserved SPOs may be in contiguous time resources that form the SPO window 425-*a* (e.g., a number of slots or OFDM symbols). Additionally, the control message (e.g., a reservation signal transmission) may reserve SPO window 425-*a*. For instance, the control message may indicate a start location and duration of the reserved SPOs within SPO window 425-*a*.

In some examples, the UE 115 may perform channel access prior to transmitting PRS in the reserved SPOs (e.g., SPOs 410-*a*, 415-*a*, 420-*a*). The channel access may be based on CAT4 LBT (e.g., type 1 channel access). Additionally or alternatively, the UE 115 may transmit sidelink PRS in an SPO if channel access succeeds for transmitting in that SPO. In one example, the indicated SPO reservation (e.g., SPO window 425-*a*) may include multiple SPOs (e.g., N SPOs, where SPO 410-*a* may be the first SPO and SPO 420-*a* may be the N SPO). The UE 115 may transmit in one SPO if channel access is successful in that SPO (e.g., channel access and/or LBT may be blocked by interference for transmission in SPO 410-*a*, but the UE 115 may succeed at performing channel access at a later time such as SPO 415-*a* or SPO 420-*a*, in which case the UE 115 may transmit the PRS in that later SPO). The UE 115 may not transmit sidelink PRS in the reserved SPOs if channel access is not successful in any of the SPOs within the SPO window 425-*a*.

In FIG. 4B, a UE 115 may transmit a control message 405-*b* indicating a set of SPOs that are uniformly and/or periodically spaced apart (e.g., spaced apart in a periodic manner). For instance, the control message 405-*b* may reserve SPOs 410-*b*, 415-*b*, and 420-*b* by indicating a starting location (e.g., the time location of SPO 410-*b*) and a period (e.g., a time duration between SPO 410-*b* and SPO 415-*b*). The UE 115 may perform channel access prior to transmitting PRS in the reserved SPOs. For instance, the channel access may be based on CAT2 LBT (e.g., type 2a or 2b channel access) when the duty cycle of the reserved SPOs is smaller than a threshold (e.g., the reserved SPOs account for less than 5% if time resources in a time window). In some examples, the UE 115 may transmit sidelink PRS in an SPO if channel access succeeds for transmitting in the SPO.

In some examples, the indicated SPO reservation in control message 405-*b* may include multiple periodic SPOs (e.g., M SPOs, where SPO 410-*b* is the first SPO and SPO 420-*b* is the Mth SPO). The UE 115 may transmit in a reserved SPO if channel access is successful for transmitting in that SPO. The UE 115 may not transmit sidelink PRS in a reserved SPO if channel access is not successful for that SPO.

In FIG. 4C, a UE 115 may transmit a control message 405-*c* indicating multiple sets of SPO windows 425. For instance, control message 405-*c* may indicate SPO window 425-*b* that includes SPOs 410-*c*, 415-*c*, and 420-*c* and may indicate SPO window 425-*c* that includes SPOs 410-*d*, 415-*d*, and 420-*d*. The multiple SPO windows 425 may be uniformly spaced (e.g., may be spaced periodically). Additionally, control message 405-*c* may reserve a number of period SPO windows (e.g., control message 405-*c* may indicate a start location and period of the reserved SPO window 425-*c* as well as a number of SPOs X in each SPO window 425 and/or a duration of each SPO window 425).

The UE 115 may perform channel access prior to transmitting PRS in the reserved SPOs. In one example, the channel access may be based on CAT4 LBT (e.g., type 1 channel access). In another example, the channel access may be based on CAT2 LBT (e.g., type 2a or 2b channel access) when the duty cycle of the reserved SPOs is smaller than a threshold (e.g., the reserved SPOs account for less than 5% of time resources in a time window). In some examples, the UE 115 may transmit sidelink PRS in no more than one SPO in each SPO window 425. Additionally or alternatively, the UE 115 may transmit sidelink PRS in each reserved SPO window (e.g., if channel access succeeds for transmitting in that SPO window).

In one example, the indicated SPO reservation contains multiple and periodic SPO windows 425 (e.g., Y SPO windows 425, where SPO window 425-*b* may be a first SPO window 425 and SPO window 425-*c* may be a Yth SPO window 425), where each SPO window has X SPOs. The UE 115 may transmit PRS in a reserved SPO window 425 if channel access is successful for transmitting in an SPO of that SPO window 425.

Figure 5:
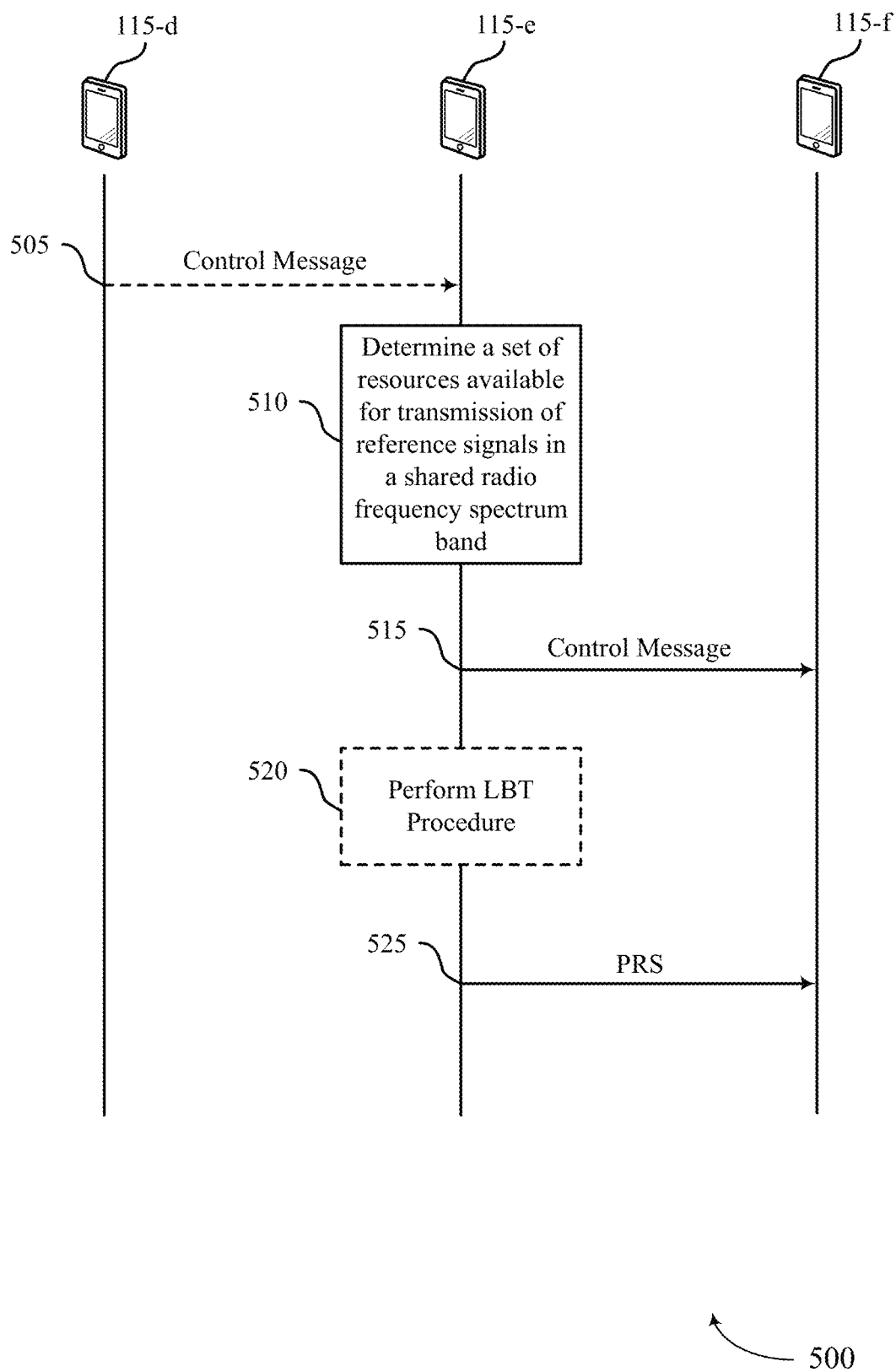
FIG. 5 illustrates an example of a process flow that supports reservation based sidelink reference signal transmission for positioning in accordance with aspects of the present disclosure.

FIG. 5 illustrates an example of a process flow 500 that supports reservation based sidelink reference signal transmission for positioning in accordance with aspects of the present disclosure. In some examples, process flow 500 may be implemented by one or more aspects of wireless communications system 100. For instance, UEs 115-*d*, 115-*e*, and 115-*f* may be examples of UEs 115 as described with reference to FIG. 1.

At 505, UE 115-*d* may transmit, to UE 115-*e*, a first control message reserving a first set of resources for UE 115-*d* to transmit one or more first reference signals in a shared radio frequency spectrum band.

At 510, UE 115-*e* may determine a second set of resources for transmission one or more reference signals in the shared radio frequency spectrum band in a time interval for sidelink positioning. In some examples, UE 115-*e* may determine the second set of resources based on the first set of resources for UE 115-*d* reserved by the first control message.

At 515, UE 115-e may transmit, to UE 115-f, and in a second radio frequency spectrum band, a second control message reserving the second set of resources for UE 115-e to transmit the one or more second reference signals in the time interval for sidelink positioning. In some examples, the control message may identify a time window (e.g., an SPO window) that includes the set of resources within the time interval. In some such examples, the control message may identify a start time and a duration of the time window. In some examples, the control message may identify a number of slots or a number of symbols associated with the time window. In some examples, each resource of the set of resources is contiguous with at least one other resource of the set of resources.

In some examples, the control message may further reserve a third set of resources for UE 115-e to transmit the one or more second reference signals for sidelink positioning on at least on resource of the second set of resources and at least one resource of the third set of resources. In some such examples, the control message may identify a first time window (e.g., a first SPO window) that includes the second set of resources and a second time window (e.g., a second SPO window) that includes the third set of resources. The first time window and the second time window may be within the time interval. In some such examples, the control message may indicate a period, where the second set of resources are spaced relative to the third set of resources according to the period. In some examples, transmitting the control message may include transmitting the control message identifying a period for the set of resources. In some examples, the control message may be transmitted via sidelink shared channel signaling, RRC signaling, MAC-CE signaling, or sidelink control information (SCI) signaling.

At 520, UE 115-e may perform at least one LBT procedure in the shared radio frequency spectrum band for the second set of resources.

At 525, UE 115-e may transmit, to UE 115-f, the one or more reference signals on the second set of resources based on transmitting the control message reserving the set of resources. In some examples, transmitting the one or more reference signals includes transmitting a first reference signal on a first resource of the second set of resources and a second reference signal on a second resource of the third set of resources. In some examples, the shared radio frequency spectrum band may include an unlicensed radio frequency spectrum band and the second radio frequency band may include a licensed radio frequency spectrum band. In some examples, transmitting the one or more reference signals may be based on performing the at least one LBT procedure (e.g., at 520).

Figure 6:
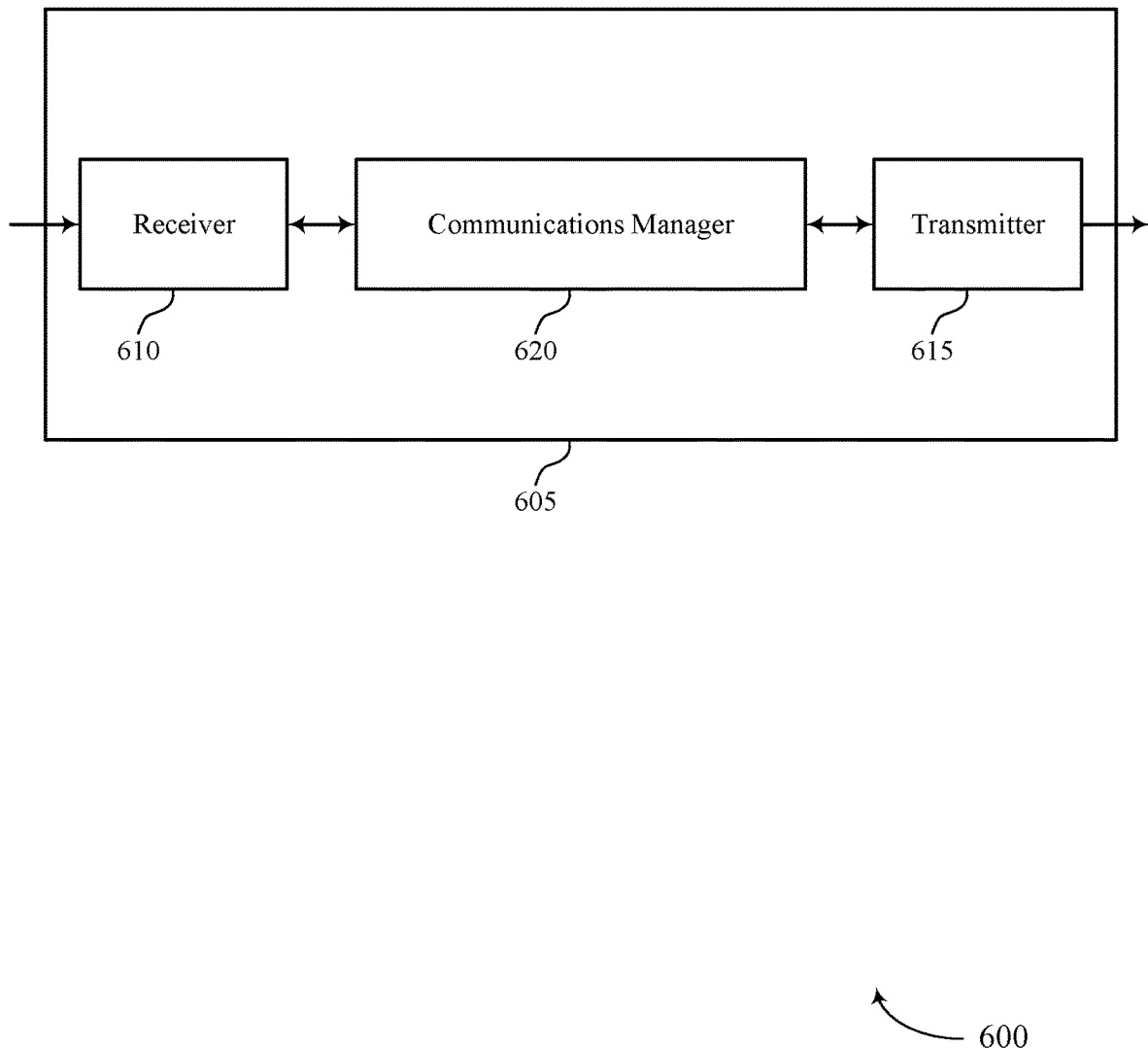
FIGS. 6 and 7 show block diagrams of devices that support reservation based sidelink reference signal transmission for positioning in accordance with aspects of the present disclosure.

FIG. 6 shows a block diagram 600 of a device 605 that supports reservation based sidelink reference signal transmission for positioning in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reservation based sidelink reference signal transmission for positioning). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reservation based sidelink reference signal transmission for positioning). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of reservation based sidelink reference signal transmission for positioning as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for determining a set of resources available for transmission of one or more reference signals in a shared radio frequency spectrum band in a time interval for sidelink positioning. The communications manager 620 may be configured as or otherwise support a means for transmitting, in a second radio frequency spectrum band, a control message reserving the set of resources for the UE to transmit the one or more reference signals in the time interval for sidelink positioning. The communications manager 620 may be configured as or otherwise support a means for transmitting the one or more reference signals on the set of resources based on transmitting the control message reserving the set of resources.

Additionally or alternatively, the communications manager 620 may support wireless communication at a first UE in accordance with examples as disclosed herein. For example, the communications manager 620 may be configured as or otherwise support a means for receiving, from a second UE in a second radio frequency spectrum band, a control message reserving a set of resources for the second UE to transmit one or more reference signals in an shared radio frequency spectrum band in a time interval for sidelink positioning. The communications manager 620 may be configured as or otherwise support a means for receiving, from the second UE, the one or more reference signals on the set of resources based on receiving the control message reserving the set of resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for the device 605 to resolve uncertainty associated with a PRS transmission and/or to mitigate or reduce transmission collisions.

Figure 7:
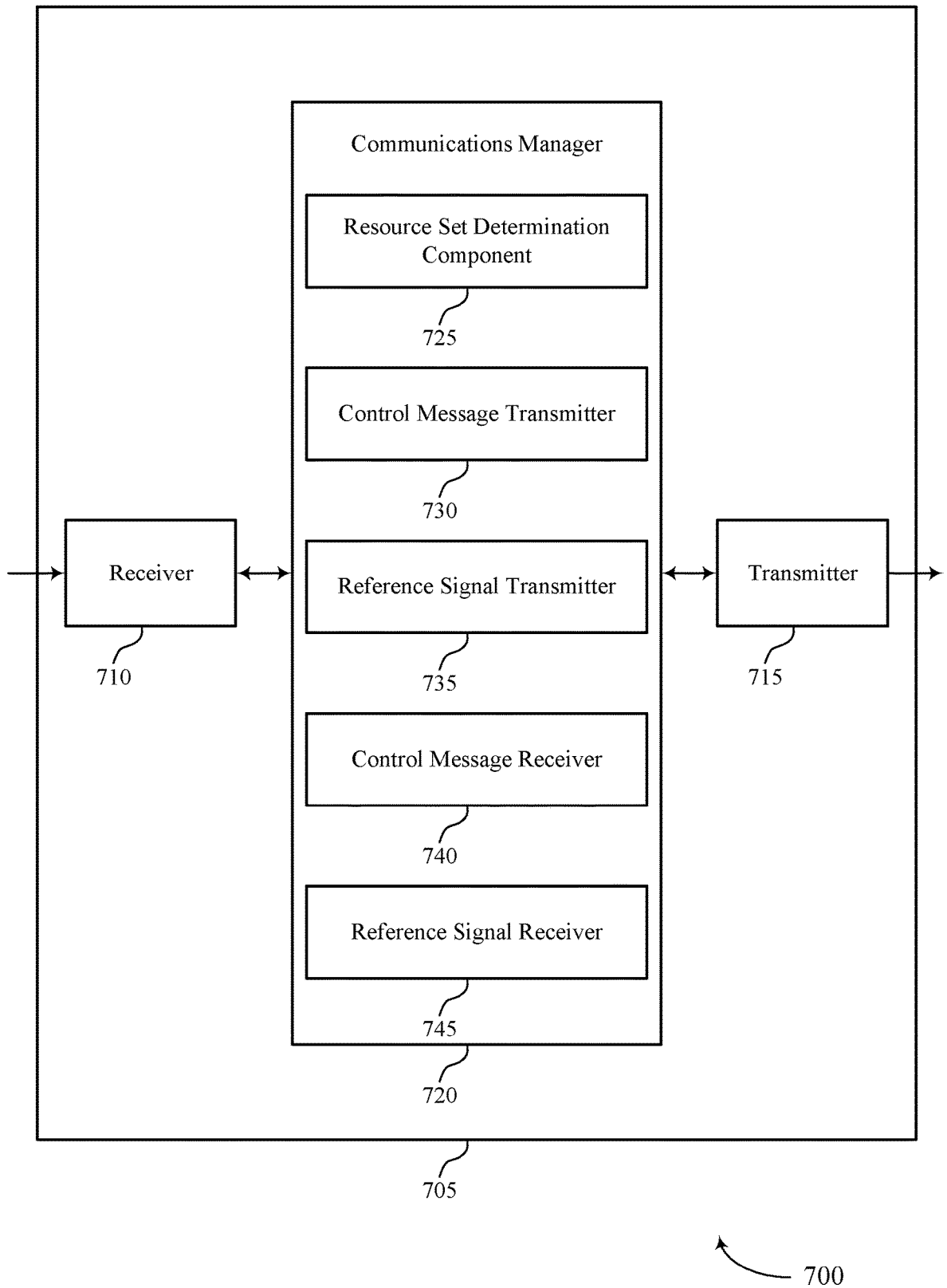

FIG. 7 shows a block diagram 700 of a device 705 that supports reservation based sidelink reference signal transmission for positioning in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reservation based sidelink reference signal transmission for positioning). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reservation based sidelink reference signal transmission for positioning). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of reservation based sidelink reference signal transmission for positioning as described herein. For example, the communications manager 720 may include a resource set determination component 725, a control message transmitter 730, a reference signal transmitter 735, a control message receiver 740, a reference signal receiver 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The resource set determination component 725 may be configured as or otherwise support a means for determining a set of resources available for transmission of one or more reference signals in a shared radio frequency spectrum band in a time interval for sidelink positioning. The control message transmitter 730 may be configured as or otherwise support a means for transmitting, in a second radio frequency spectrum band, a control message reserving the set of resources for the UE to transmit the one or more reference signals in the time interval for sidelink positioning. The reference signal transmitter 735 may be configured as or otherwise support a means for transmitting the one or more reference signals on the set of resources based on transmitting the control message reserving the set of resources.

Additionally or alternatively, the communications manager 720 may support wireless communication at a first UE in accordance with examples as disclosed herein. The control message receiver 740 may be configured as or otherwise support a means for receiving, from a second UE in a second radio frequency spectrum band, a control message reserving a set of resources for the second UE to transmit one or more reference signals in an shared radio frequency spectrum band in a time interval for sidelink positioning. The reference signal receiver 745 may be configured as or otherwise support a means for receiving, from the second UE, the one or more reference signals on the set of resources based on receiving the control message reserving the set of resources.

Figure 8:
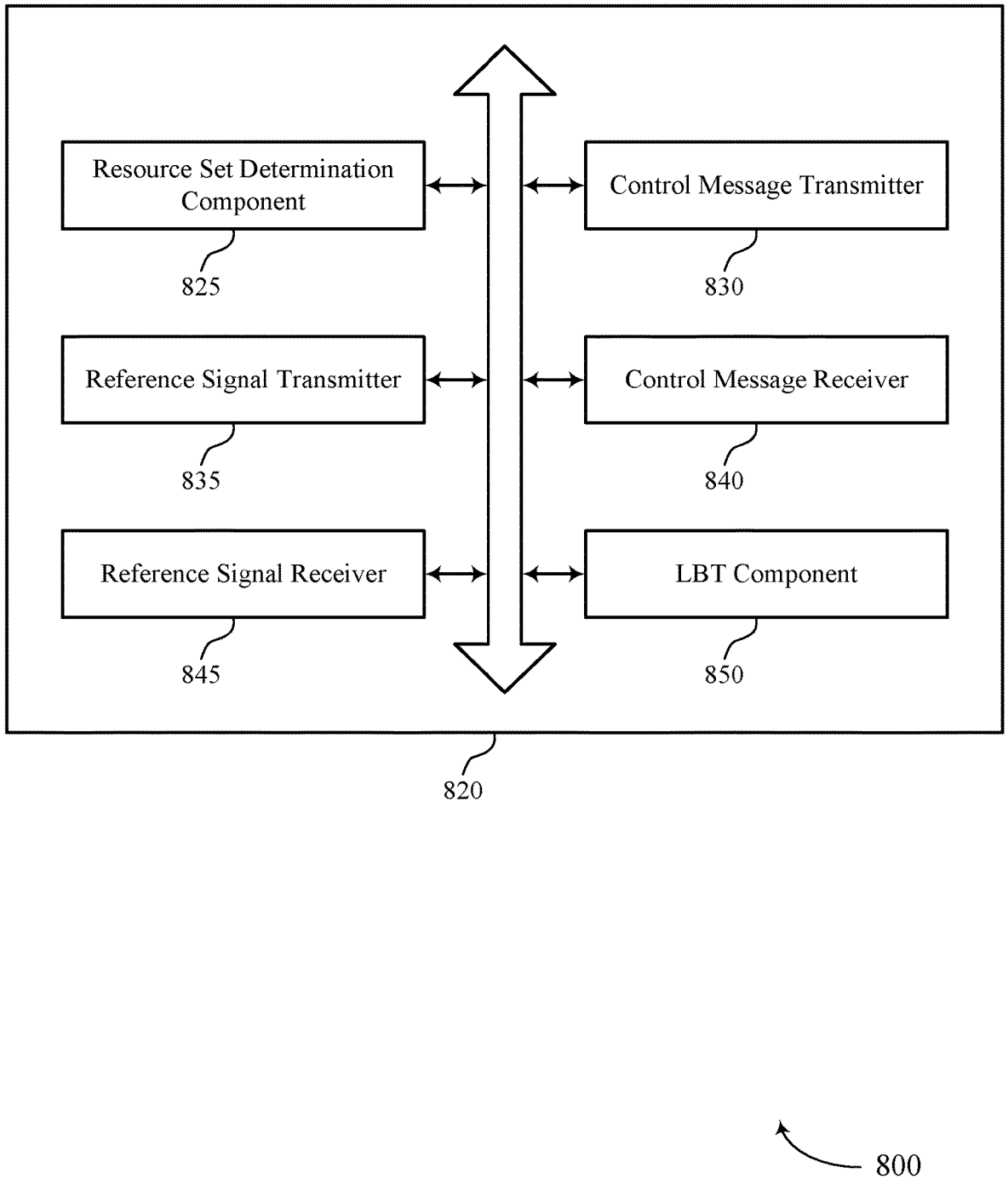
FIG. 8 shows a block diagram of a communications manager that supports reservation based sidelink reference signal transmission for positioning in accordance with aspects of the present disclosure.

FIG. 8 shows a block diagram 800 of a communications manager 820 that supports reservation based sidelink reference signal transmission for positioning in accordance with aspects of the present disclosure. The communications manager 820 may be an example of aspects of a communications manager 620, a communications manager 720, or both, as described herein. The communications manager 820, or various components thereof, may be an example of means for performing various aspects of reservation based sidelink reference signal transmission for positioning as described herein. For example, the communications manager 820 may include a resource set determination component 825, a control message transmitter 830, a reference signal transmitter 835, a control message receiver 840, a reference signal receiver 845, an LBT component 850, or any combination thereof. Each of these components may communicate, directly or indirectly, with one another (e.g., via one or more buses).

The communications manager 820 may support wireless communication at a UE in accordance with examples as disclosed herein. The resource set determination component 825 may be configured as or otherwise support a means for determining a set of resources available for transmission of one or more reference signals in a shared radio frequency spectrum band in a time interval for sidelink positioning. The control message transmitter 830 may be configured as or otherwise support a means for transmitting, in a second radio frequency spectrum band, a control message reserving the set of resources for the UE to transmit the one or more reference signals in the time interval for sidelink positioning. The reference signal transmitter 835 may be configured as or otherwise support a means for transmitting the one or more reference signals on the set of resources based on transmitting the control message reserving the set of resources.

In some examples, the control message receiver 840 may be configured as or otherwise support a means for receiving, from a second UE, a second control message reserving a second set of resources for the second UE to transmit one or more second reference signals in the shared radio frequency spectrum band, where determining the set of resources available for transmission of the one or more reference signals is based on the second set of resources for the second UE reserved by the second control message.

In some examples, to support transmitting the control message, the control message transmitter 830 may be configured as or otherwise support a means for transmitting the control message identifying a time window that includes the set of resources within the time interval.

In some examples, to support transmitting the control message identifying the time window, the control message transmitter 830 may be configured as or otherwise support a means for transmitting the control message identifying a start time and a duration of the time window.

In some examples, to support transmitting the control message identifying the time window, the control message transmitter 830 may be configured as or otherwise support a means for transmitting the control message identifying a number of slots or a number of symbols associated with the time window.

In some examples, each resource of the set of resources is contiguous with at least one other resource of the set of resources.

In some examples, to support transmitting the control message, the control message transmitter 830 may be configured as or otherwise support a means for transmitting the control message further reserving a second set of resources for the UE to transmit the one or more reference signals for sidelink positioning on at least one resource of the set of resources and at least one resource of the second set of resources.

In some examples, to support transmitting the control message, the control message transmitter 830 may be configured as or otherwise support a means for transmitting the control message identifying a first time window that includes the set of resources and a second time window that includes the second set of resources, where the first time window and the second time window are within the time interval.

In some examples, to support transmitting the control message, the control message transmitter 830 may be configured as or otherwise support a means for transmitting the control message indicating a period, where the set of resources is spaced relative to the second set of resources according to the period.

In some examples, to support transmitting the one or more reference signals, the reference signal transmitter 835 may be configured as or otherwise support a means for transmitting a first reference signal on a first resource of the set of resources. In some examples, to support transmitting the one or more reference signals, the reference signal transmitter 835 may be configured as or otherwise support a means for transmitting a second reference signal on a second resource of the second set of resources.

In some examples, to support transmitting the control message, the control message transmitter 830 may be configured as or otherwise support a means for transmitting the control message identifying a period for the set of resources.

In some examples, the LBT component 850 may be configured as or otherwise support a means for performing at least one listen-before-talk procedure in the shared radio frequency spectrum band for the set of resources, where transmitting the one or more reference signals is based on performing the at least one listen-before-talk procedure.

In some examples, the control message is transmitted via sidelink shared channel signaling, radio resource control signaling, medium access control (MAC) control element signaling, or sidelink control information signaling.

In some examples, shared radio frequency spectrum band includes an unlicensed radio frequency spectrum band, and the second radio frequency spectrum band includes a licensed radio frequency spectrum band.

Additionally or alternatively, the communications manager 820 may support wireless communication at a first UE in accordance with examples as disclosed herein. The control message receiver 840 may be configured as or otherwise support a means for receiving, from a second UE in a second radio frequency spectrum band, a control message reserving a set of resources for the second UE to transmit one or more reference signals in an shared radio frequency spectrum band in a time interval for sidelink positioning. The reference signal receiver 845 may be configured as or otherwise support a means for receiving, from the second UE, the one or more reference signals on the set of resources based on receiving the control message reserving the set of resources.

In some examples, to support receiving the control message, the control message receiver 840 may be configured as or otherwise support a means for receiving the control message identifying a time window that includes the set of resources within the time interval.

In some examples, to support receiving the control message identifying the time window, the control message receiver 840 may be configured as or otherwise support a means for receiving the control message identifying a start time and a duration of the time window.

In some examples, to support receiving the control message identifying the time window, the control message receiver 840 may be configured as or otherwise support a means for receiving the control message identifying a number of slots or a number of symbols associated with the time window.

In some examples, each resource of the set of resources is contiguous with at least one other resource of the set of resources.

In some examples, to support receiving the control message, the control message receiver 840 may be configured as or otherwise support a means for receiving the control message further reserving a second set of resources for the UE to transmit the one or more reference signals for sidelink positioning on at least one resource of the set of resources and at least one resource of the second set of resources.

In some examples, to support receiving the control message, the control message receiver 840 may be configured as or otherwise support a means for receiving the control message identifying a first time window that includes the set of resources and a second time window that includes the second set of resources, where the first time window and the second time window are within the time interval.

In some examples, to support receiving the control message, the control message receiver 840 may be configured as or otherwise support a means for receiving the control message indicating a period, where the set of resources is spaced relative to the second set of resources according to the period.

In some examples, to support receiving the one or more reference signals, the reference signal receiver 845 may be configured as or otherwise support a means for receiving a first reference signal on a first resource of the set of resources. In some examples, to support receiving the one or more reference signals, the reference signal receiver 845 may be configured as or otherwise support a means for receiving a second reference signal on a second resource of the second set of resources.

In some examples, to support receiving the control message, the control message receiver 840 may be configured as or otherwise support a means for receiving the control message identifying a period for the set of resources.

Figure 9:
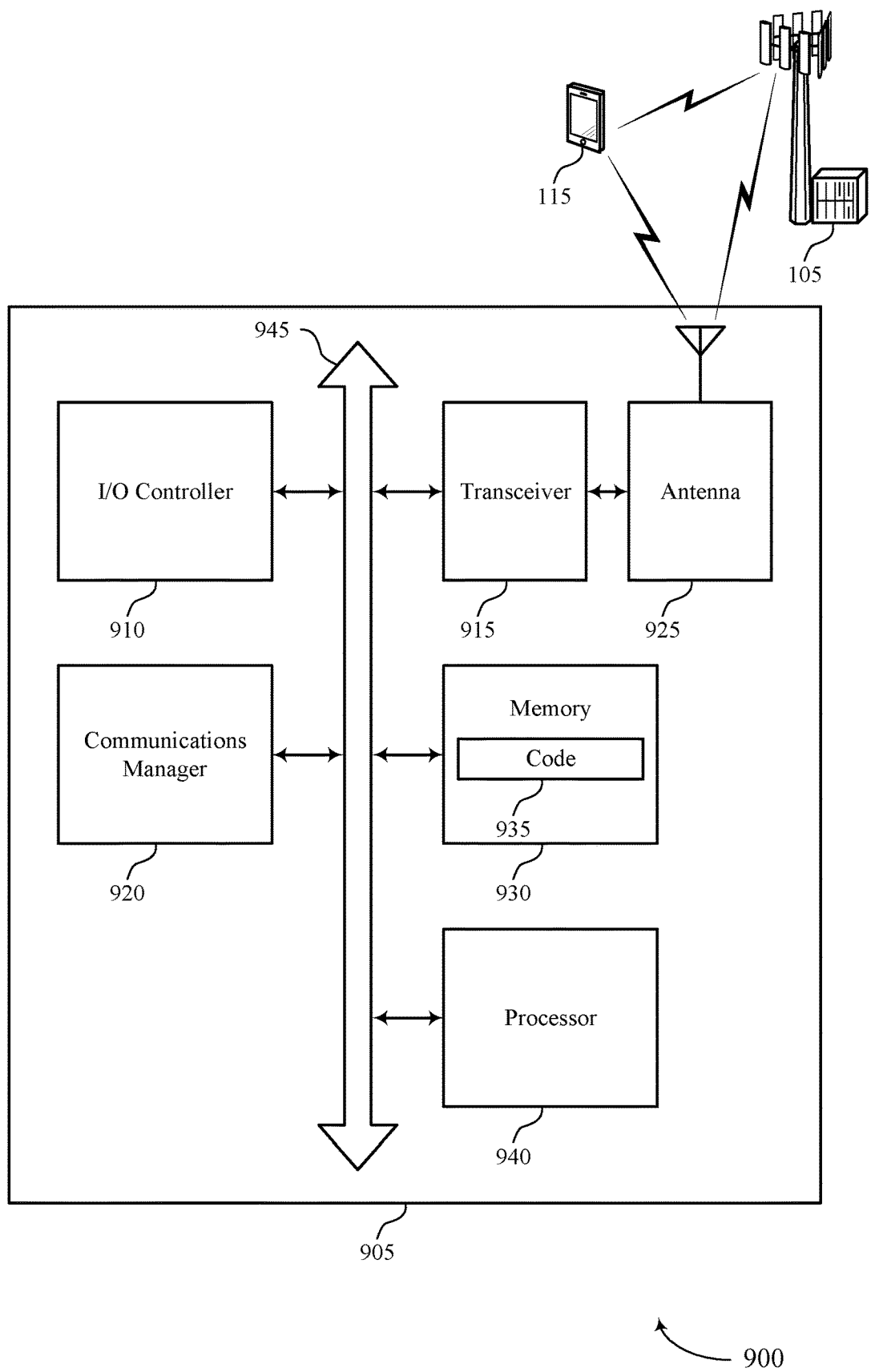
FIG. 9 shows a diagram of a system including a device that supports reservation based sidelink reference signal transmission for positioning in accordance with aspects of the present disclosure.

FIG. 9 shows a diagram of a system 900 including a device 905 that supports reservation based sidelink reference signal transmission for positioning in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting reservation based sidelink reference signal transmission for positioning). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for determining a set of resources available for transmission of one or more reference signals in a shared radio frequency spectrum band in a time interval for sidelink positioning. The communications manager 920 may be configured as or otherwise support a means for transmitting, in a second radio frequency spectrum band, a control message reserving the set of resources for the UE to transmit the one or more reference signals in the time interval for sidelink positioning. The communications manager 920 may be configured as or otherwise support a means for transmitting the one or more reference signals on the set of resources based on transmitting the control message reserving the set of resources.

Additionally or alternatively, the communications manager 920 may support wireless communication at a first UE in accordance with examples as disclosed herein. For example, the communications manager 920 may be configured as or otherwise support a means for receiving, from a second UE in a second radio frequency spectrum band, a control message reserving a set of resources for the second UE to transmit one or more reference signals in an shared radio frequency spectrum band in a time interval for sidelink positioning. The communications manager 920 may be configured as or otherwise support a means for receiving, from the second UE, the one or more reference signals on the set of resources based on receiving the control message reserving the set of resources.

By including or configuring the communications manager 920 in accordance with examples as described herein, the device 905 may support techniques for the device 905 to resolve uncertainty associated with a PRS transmission and/or to mitigate or reduce transmission collisions.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of reservation based sidelink reference signal transmission for positioning as described herein, or the processor 940 and the memory 930 may be otherwise configured to perform or support such operations.

Figure 10:
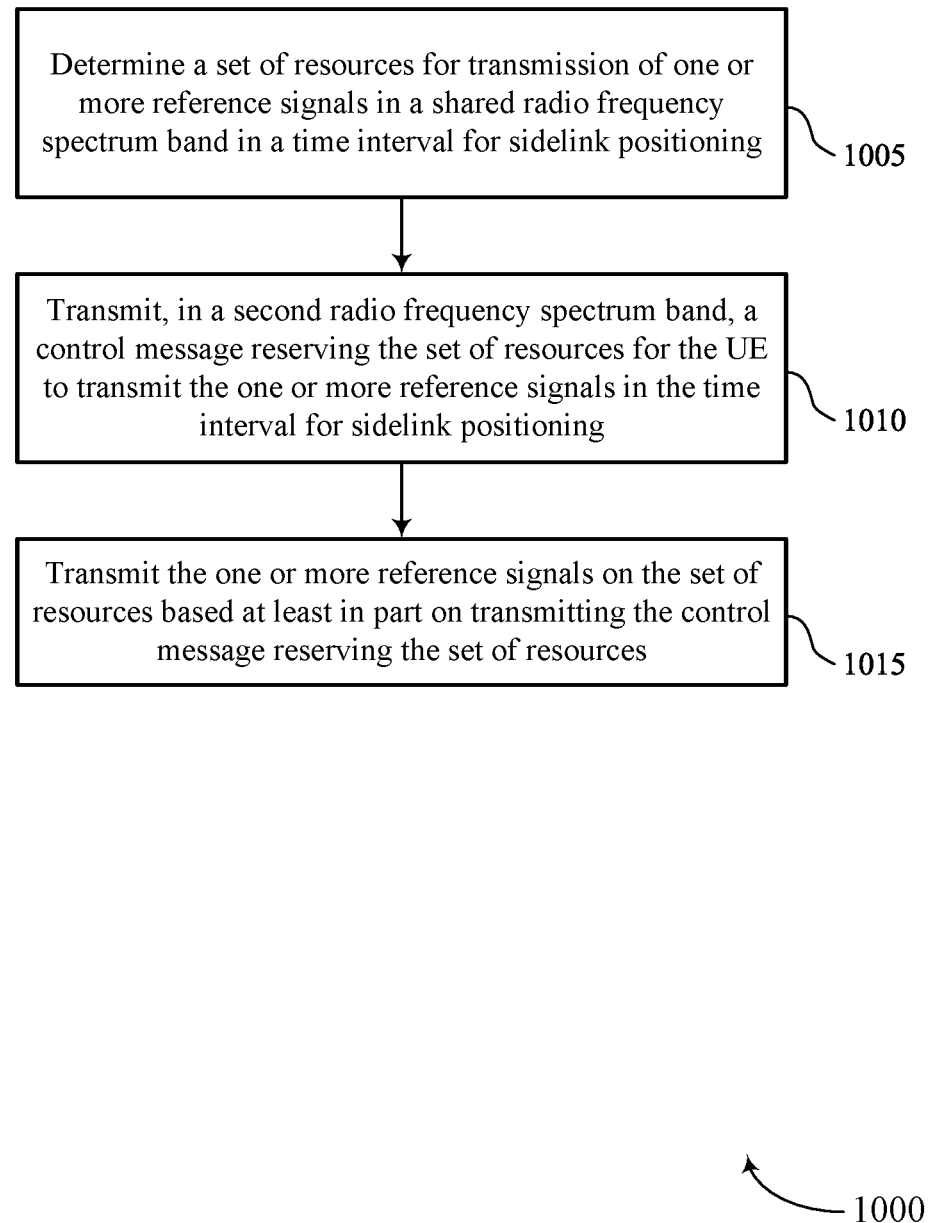
FIGS. 10 through 13 show flowcharts illustrating methods that support reservation based sidelink reference signal transmission for positioning in accordance with aspects of the present disclosure.

FIG. 10 shows a flowchart illustrating a method 1000 that supports reservation based sidelink reference signal transmission for positioning in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include determining a set of resources available for transmission of one or more reference signals in a shared radio frequency spectrum band in a time interval for sidelink positioning. The operations of 1005 may be performed in accordance with examples as disclosed herein. In some examples, aspects of the operations of 1005 may be performed by a resource set determination component 825 as described with reference to FIG. 8.

At 1010, the method may include transmitting, in a second radio frequency spectrum band, a control message reserving the set of resources for the UE to transmit the one or more reference signals in the time interval for sidelink positioning. The operations of 1010 may be performed in accordance with examples as disclosed herein. In some examples, aspects of the operations of 1010 may be performed by a control message transmitter 830 as described with reference to FIG. 8.

At 1015, the method may include transmitting the one or more reference signals on the set of resources based on transmitting the control message reserving the set of resources. The operations of 1015 may be performed in accordance with examples as disclosed herein. In some examples, aspects of the operations of 1015 may be performed by a reference signal transmitter 835 as described with reference to FIG. 8.

Figure 11:
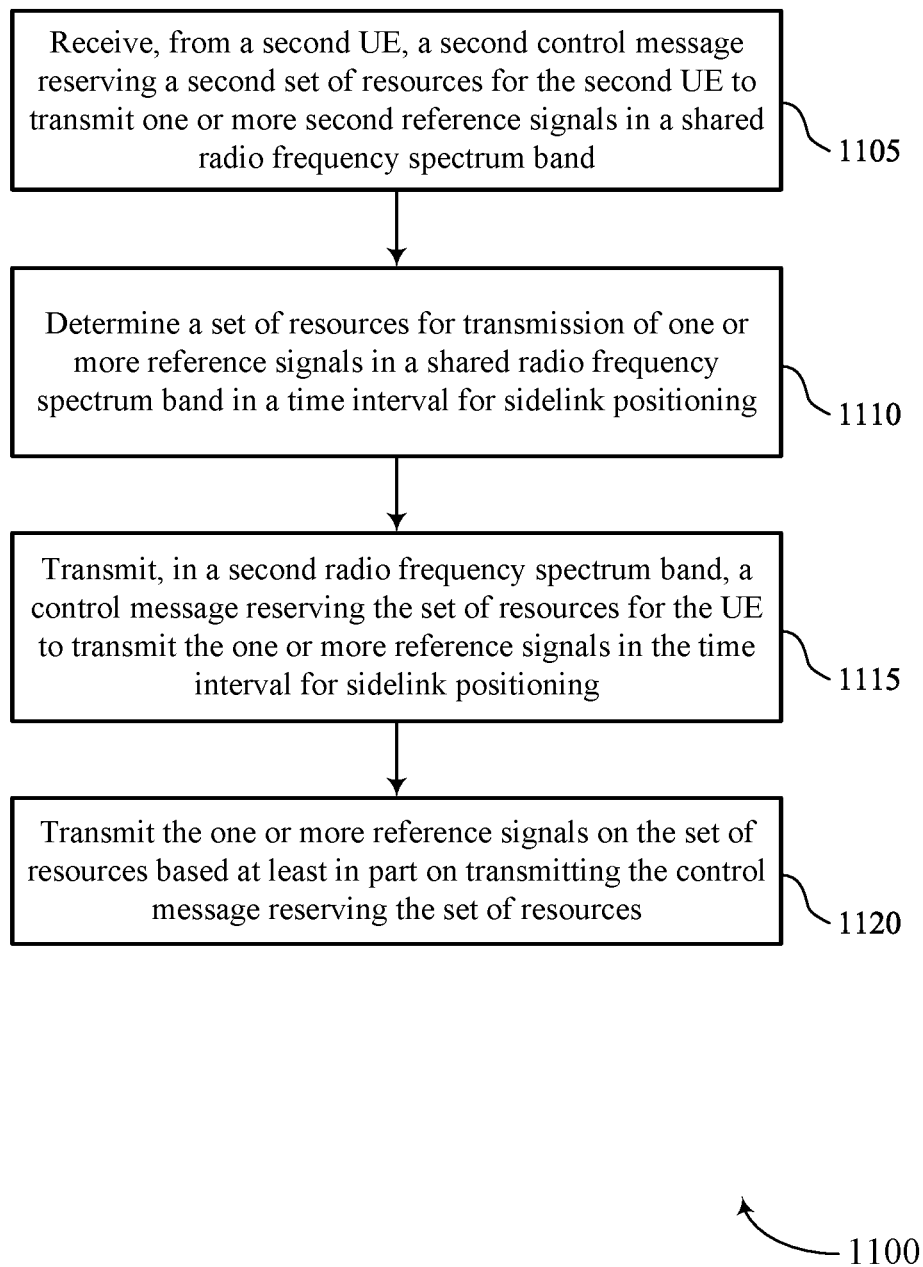

FIG. 11 shows a flowchart illustrating a method 1100 that supports reservation based sidelink reference signal transmission for positioning in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a second UE, a second control message reserving a second set of resources for the second UE to transmit one or more second reference signals in a shared radio frequency spectrum band. The operations of 1105 may be performed in accordance with examples as disclosed herein. In some examples, aspects of the operations of 1105 may be performed by a control message receiver 840 as described with reference to FIG. 8.

At 1110, the method may include determining a set of resources available for transmission of one or more reference signals in a shared radio frequency spectrum band in a time interval for sidelink positioning. The operations of 1110 may be performed in accordance with examples as disclosed herein. In some examples, aspects of the operations of 1110 may be performed by a resource set determination component 825 as described with reference to FIG. 8.

At 1115, the method may include transmitting, in a second radio frequency spectrum band, a control message reserving the set of resources for the UE to transmit the one or more reference signals in the time interval for sidelink positioning. The operations of 1115 may be performed in accordance with examples as disclosed herein. In some examples, aspects of the operations of 1115 may be performed by a control message transmitter 830 as described with reference to FIG. 8.

At 1120, the method may include transmitting the one or more reference signals on the set of resources based on transmitting the control message reserving the set of resources. The operations of 1120 may be performed in accordance with examples as disclosed herein. In some examples, aspects of the operations of 1120 may be performed by a reference signal transmitter 835 as described with reference to FIG. 8.

Figure 12:
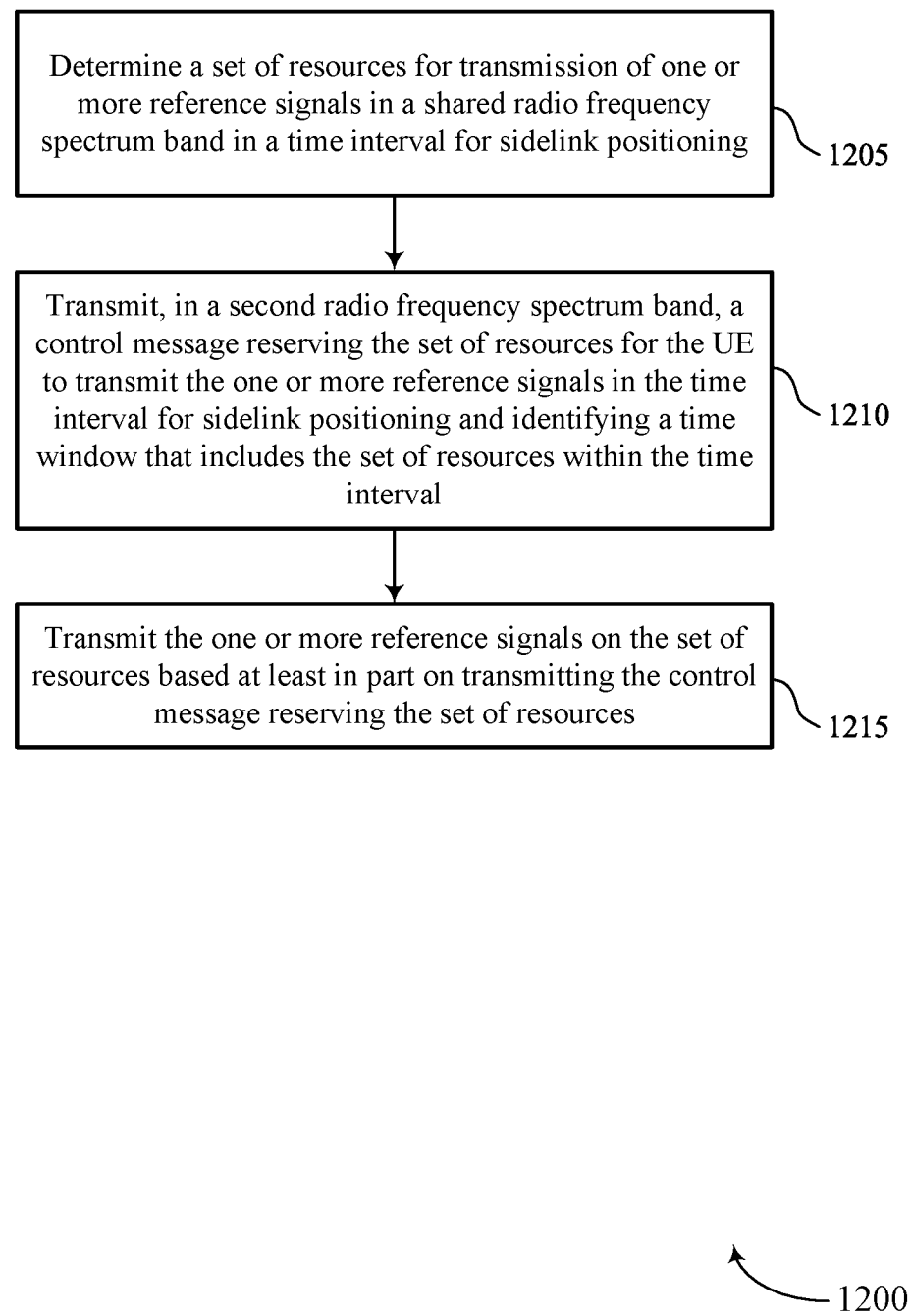

FIG. 12 shows a flowchart illustrating a method 1200 that supports reservation based sidelink reference signal transmission for positioning in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include determining a set of resources available for transmission of one or more reference signals in a shared radio frequency spectrum band in a time interval for sidelink positioning. The operations of 1205 may be performed in accordance with examples as disclosed herein. In some examples, aspects of the operations of 1205 may be performed by a resource set determination component 825 as described with reference to FIG. 8.

At 1210, the method may include transmitting, in a second radio frequency spectrum band, a control message reserving the set of resources for the UE to transmit the one or more reference signals in the time interval for sidelink positioning and identifying a time window that includes the set of resources within the time interval. The operations of 1210 may be performed in accordance with examples as disclosed herein. In some examples, aspects of the operations of 1210 may be performed by a control message transmitter 830 as described with reference to FIG. 8.

At 1215, the method may include transmitting the one or more reference signals on the set of resources based on transmitting the control message reserving the set of resources. The operations of 1215 may be performed in accordance with examples as disclosed herein. In some examples, aspects of the operations of 1215 may be performed by a reference signal transmitter 835 as described with reference to FIG. 8.

Figure 13:
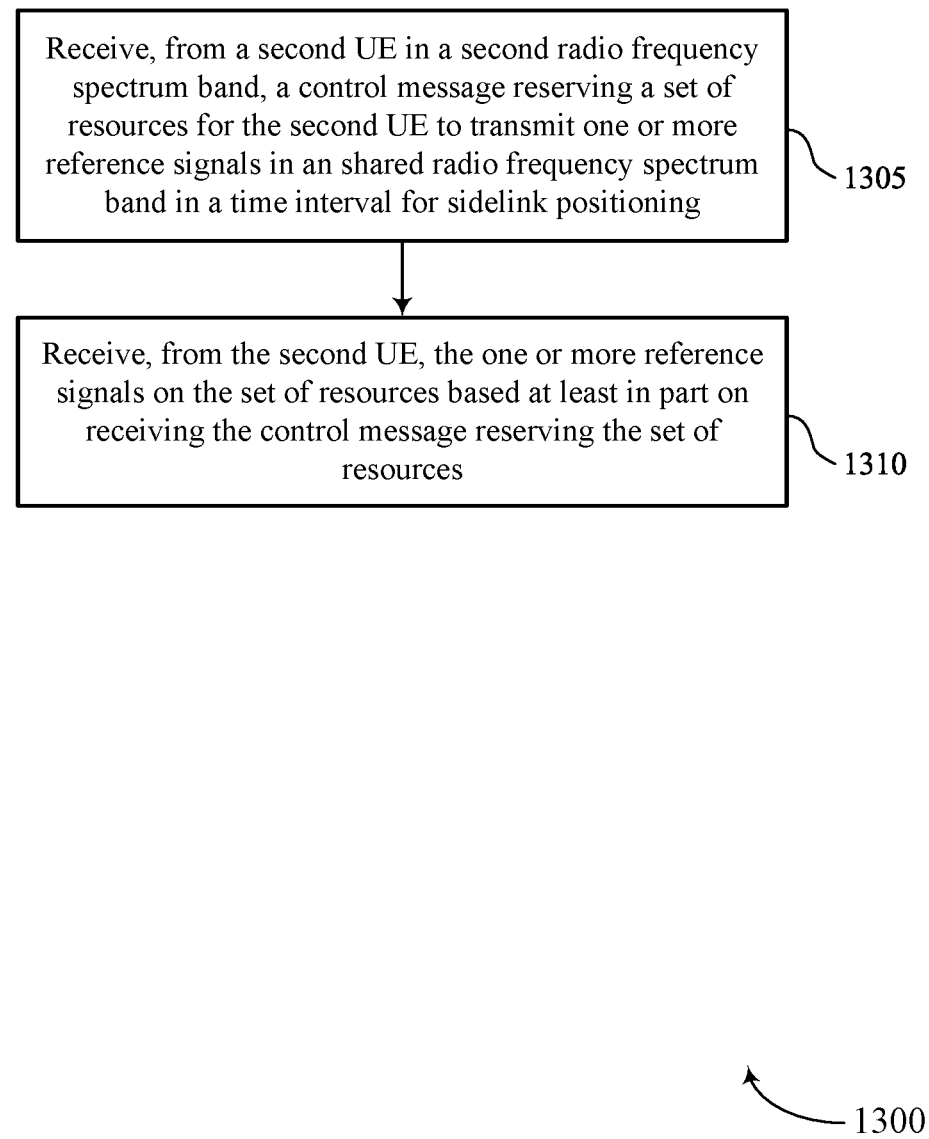

FIG. 13 shows a flowchart illustrating a method 1300 that supports reservation based sidelink reference signal transmission for positioning in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a second UE in a second radio frequency spectrum band, a control message reserving a set of resources for the second UE to transmit one or more reference signals in an shared radio frequency spectrum band in a time interval for sidelink positioning. The operations of 1305 may be performed in accordance with examples as disclosed herein. In some examples, aspects of the operations of 1305 may be performed by a control message receiver 840 as described with reference to FIG. 8.

At 1310, the method may include receiving, from the second UE, the one or more reference signals on the set of resources based on receiving the control message reserving the set of resources. The operations of 1310 may be performed in accordance with examples as disclosed herein. In some examples, aspects of the operations of 1310 may be performed by a reference signal receiver 845 as described with reference to FIG. 8.

The following provides an overview of aspects of the present disclosure:

Aspect 1: A method for wireless communication at a UE, comprising: determining a set of resources available for transmission of one or more reference signals in a shared radio frequency spectrum band in a time interval for sidelink positioning; transmitting, in a second radio frequency spectrum band, a control message reserving the set of resources for the UE to transmit the one or more reference signals in the time interval for sidelink positioning; and transmitting the one or more reference signals on the set of resources based at least in part on transmitting the control message reserving the set of resources.

Aspect 2: The method of aspect 1, further comprising: receiving, from a second UE, a second control message reserving a second set of resources for the second UE to transmit one or more second reference signals in the shared radio frequency spectrum band, wherein determining the set of resources available for transmission of the one or more reference signals is based at least in part on the second set of resources for the second UE reserved by the second control message.

Aspect 3: The method of any of aspects 1 through 2, wherein transmitting the control message further comprises: transmitting the control message identifying a time window that includes the set of resources within the time interval.

Aspect 4: The method of aspect 3, wherein transmitting the control message identifying the time window comprises: transmitting the control message identifying a start time and a duration of the time window.

Aspect 5: The method of any of aspects 3 through 4, wherein transmitting the control message identifying the time window comprises: transmitting the control message identifying a number of slots or a number of symbols associated with the time window.

Aspect 6: The method of any of aspects 3 through 5, wherein each resource of the set of resources is contiguous with at least one other resource of the set of resources.

Aspect 7: The method of any of aspects 1 through 6, wherein transmitting the control message further comprises: transmitting the control message further reserving a second set of resources for the UE to transmit the one or more reference signals for sidelink positioning on at least one resource of the set of resources and at least one resource of the second set of resources.

Aspect 8: The method of aspect 7, wherein transmitting the control message further comprises: transmitting the control message identifying a first time window that includes the set of resources and a second time window that includes the second set of resources, wherein the first time window and the second time window are within the time interval.

Aspect 9: The method of aspect 8, wherein transmitting the control message further comprises: transmitting the control message indicating a period, wherein the set of resources is spaced relative to the second set of resources according to the period.

Aspect 10: The method of any of aspects 7 through 9, wherein transmitting the one or more reference signals comprises: transmitting a first reference signal on a first resource of the set of resources; and transmitting a second reference signal on a second resource of the second set of resources.

Aspect 11: The method of any of aspects 1 through 10, wherein transmitting the control message further comprises: transmitting the control message identifying a period for the set of resources.

Aspect 12: The method of any of aspects 1 through 11, further comprising: performing at least one listen-before-talk procedure in the shared radio frequency spectrum band for the set of resources, wherein transmitting the one or more reference signals is based at least in part on performing the at least one listen-before-talk procedure.

Aspect 13: The method of any of aspects 1 through 12, wherein the control message is transmitted via sidelink shared channel signaling, radio resource control signaling, medium access control (MAC) control element signaling, or sidelink control information signaling.

Aspect 14: The method of any of aspects 1 through 13, wherein the shared radio frequency spectrum band comprises an unlicensed radio frequency spectrum band, and the second radio frequency spectrum band comprises a licensed radio frequency spectrum band.

Aspect 15: A method for wireless communication at a first UE, comprising: receiving, from a second UE in a second radio frequency spectrum band, a control message reserving a set of resources for the second UE to transmit one or more reference signals in an shared radio frequency spectrum band in a time interval for sidelink positioning; and receiving, from the second UE, the one or more reference signals on the set of resources based at least in part on receiving the control message reserving the set of resources.

Aspect 16: The method of aspect 15, wherein receiving the control message further comprises: receiving the control message identifying a time window that includes the set of resources within the time interval.

Aspect 17: The method of aspect 16, wherein receiving the control message identifying the time window comprises: receiving the control message identifying a start time and a duration of the time window.

Aspect 18: The method of any of aspects 16 through 17, wherein receiving the control message identifying the time window comprises: receiving the control message identifying a number of slots or a number of symbols associated with the time window.

Aspect 19: The method of any of aspects 16 through 18, wherein each resource of the set of resources is contiguous with at least one other resource of the set of resources.

Aspect 20: The method of any of aspects 15 through 19, wherein receiving the control message further comprises: receiving the control message further reserving a second set of resources for the UE to transmit the one or more reference signals for sidelink positioning on at least one resource of the set of resources and at least one resource of the second set of resources.

Aspect 21: The method of aspect 20, wherein receiving the control message further comprises: receiving the control message identifying a first time window that includes the set of resources and a second time window that includes the second set of resources, wherein the first time window and the second time window are within the time interval.

Aspect 22: The method of aspect 21, wherein receiving the control message further comprises: receiving the control message indicating a period, wherein the set of resources is spaced relative to the second set of resources according to the period.

Aspect 23: The method of any of aspects 20 through 22, wherein receiving the one or more reference signals comprises: receiving a first reference signal on a first resource of the set of resources; and receiving a second reference signal on a second resource of the second set of resources.

Aspect 24: The method of any of aspects 15 through 23, wherein receiving the control message further comprises: receiving the control message identifying a period for the set of resources.

Aspect 25: An apparatus for wireless communication at a UE, comprising a processor; memory coupled with the processor; and instructions stored in the memory and executable by the processor to cause the apparatus to perform a method of any of aspects 1 through 14.

Aspect 26: An apparatus for wireless communication at a UE, comprising at least one means for performing a method of any of aspects 1 through 14.

Aspect 27: A non-transitory computer-readable medium storing code for wireless communication at a UE, the code comprising instructions executable by a processor to perform a method of any of aspects 1 through 14.

Aspect 28: An apparatus for wireless communication at a first UE, comprising a processor; memory coupled with the processor; and instructions stored in the memory and executable by the processor to cause the apparatus to perform a method of any of aspects 15 through 24.

Aspect 29: An apparatus for wireless communication at a first UE, comprising at least one means for performing a method of any of aspects 15 through 24.

Aspect 30: A non-transitory computer-readable medium storing code for wireless communication at a first UE, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   determining, based at least in part on determining that a first bandwidth for transmission of one or more reference signals is larger than a second bandwidth available in a second radio frequency spectrum band, a set of resources available for transmission of the one or more reference signals in a shared radio frequency spectrum band in a time interval for sidelink positioning;
   transmitting, in the second radio frequency spectrum band, a control message reserving the set of resources for the UE to transmit the one or more reference signals in the time interval for sidelink positioning; and
   transmitting the one or more reference signals on the set of resources based at least in part on transmitting the control message reserving the set of resources.

2. The method of claim 1, further comprising:
   receiving, from a second UE, a second control message reserving a second set of resources for the second UE to transmit one or more second reference signals in the shared radio frequency spectrum band, wherein determining the set of resources available for transmission of the one or more reference signals is based at least in part on the second set of resources for the second UE reserved by the second control message.

3. The method of claim 1, wherein transmitting the control message further comprises:
   transmitting the control message identifying a time window that includes the set of resources within the time interval.

4. The method of claim 3, wherein transmitting the control message identifying the time window comprises:
   transmitting the control message identifying a start time and a duration of the time window.

5. The method of claim 3, wherein transmitting the control message identifying the time window comprises:
   transmitting the control message identifying a number of slots or a number of symbols associated with the time window.

6. The method of claim 3, wherein each resource of the set of resources is contiguous with at least one other resource of the set of resources.

7. The method of claim 1, wherein transmitting the control message further comprises:
   transmitting the control message further reserving a second set of resources for the UE to transmit the one or more reference signals for sidelink positioning on at least one resource of the set of resources and at least one resource of the second set of resources.

8. The method of claim 7, wherein transmitting the control message further comprises:
   transmitting the control message identifying a first time window that includes the set of resources and a second time window that includes the second set of resources, wherein the first time window and the second time window are within the time interval.

9. The method of claim 8, wherein transmitting the control message further comprises:

transmitting the control message indicating a period, wherein the set of resources is spaced relative to the second set of resources according to the period.

10. The method of claim 7, wherein transmitting the one or more reference signals comprises:
   transmitting a first reference signal on a first resource of the set of resources; and
   transmitting a second reference signal on a second resource of the second set of resources.

11. The method of claim 1, wherein transmitting the control message further comprises:
   transmitting the control message identifying a period for the set of resources.

12. The method of claim 1, further comprising:
   performing at least one listen-before-talk procedure in the shared radio frequency spectrum band for the set of resources, wherein transmitting the one or more reference signals is based at least in part on performing the at least one listen-before-talk procedure.

13. The method of claim 1, wherein the control message is transmitted via sidelink shared channel signaling, radio resource control signaling, medium access control (MAC) control element signaling, or sidelink control information signaling.

14. The method of claim 1, wherein the shared radio frequency spectrum band comprises an unlicensed radio frequency spectrum band, and the second radio frequency spectrum band comprises a licensed radio frequency spectrum band.

15. A method for wireless communication at a first user equipment (UE), comprising:
   receiving a control message from a second UE in a second radio frequency spectrum band based at least in part on a first bandwidth for transmission of one or more reference signals being larger than a second bandwidth available in a second radio frequency spectrum band, the control message reserving a set of resources for the second UE to transmit the one or more reference signals in a shared radio frequency spectrum band in a time interval for sidelink positioning; and
   receiving, from the second UE, the one or more reference signals on the set of resources based at least in part on receiving the control message reserving the set of resources.

16. The method of claim 15, wherein receiving the control message further comprises:
   receiving the control message identifying a time window that includes the set of resources within the time interval.

17. The method of claim 16, wherein receiving the control message identifying the time window comprises:
   receiving the control message identifying a start time and a duration of the time window.

18. The method of claim 16, wherein receiving the control message identifying the time window comprises:
   receiving the control message identifying a number of slots or a number of symbols associated with the time window.

19. The method of claim 16, wherein each resource of the set of resources is contiguous with at least one other resource of the set of resources.

20. The method of claim 15, wherein receiving the control message further comprises:
   receiving the control message further reserving a second set of resources for the UE to transmit the one or more reference signals for sidelink positioning on at least one resource of the set of resources and at least one resource of the second set of resources.

21. The method of claim 20, wherein receiving the control message further comprises:
   receiving the control message identifying a first time window that includes the set of resources and a second time window that includes the second set of resources, wherein the first time window and the second time window are within the time interval.

22. The method of claim 21, wherein receiving the control message further comprises:
   receiving the control message indicating a period, wherein the set of resources is spaced relative to the second set of resources according to the period.

23. The method of claim 20, wherein receiving the one or more reference signals comprises:
   receiving a first reference signal on a first resource of the set of resources; and
   receiving a second reference signal on a second resource of the second set of resources.

24. The method of claim 15, wherein receiving the control message further comprises:
   receiving the control message identifying a period for the set of resources.

25. An apparatus for wireless communication at a user equipment (UE), comprising:
   one or more processors;
   memory coupled with the one or more processors; and
   instructions stored in the memory and executable by the one or more processors, individually or collectively, to cause the apparatus to:
      determine, based at least in part on determining that a first bandwidth for transmission of one or more reference signals is larger than a second bandwidth available in a second radio frequency spectrum band, a set of resources available for transmission of the one or more reference signals in a shared radio frequency spectrum band in a time interval for sidelink positioning;
      transmit, in the second radio frequency spectrum band, a control message reserving the set of resources for the UE to transmit the one or more reference signals in the time interval for sidelink positioning; and
      transmit the one or more reference signals on the set of resources based at least in part on transmitting the control message reserving the set of resources.

26. The apparatus of claim 25, wherein the instructions are further executable by the one or more processors, individually or collectively, to cause the apparatus to:
   receive, from a second UE, a second control message reserving a second set of resources for the second UE to transmit one or more second reference signals in the shared radio frequency spectrum band, wherein determining the set of resources available for transmission of the one or more reference signals is based at least in part on the second set of resources for the second UE reserved by the second control message.

27. The apparatus of claim 25, wherein the instructions to transmit the control message are further executable by the one or more processors, individually or collectively, to cause the apparatus to:
   transmit the control message identifying a time window that includes the set of resources within the time interval.

28. The apparatus of claim 25, wherein the instructions to transmit the control message are further executable by the one or more processors, individually or collectively, to cause the apparatus to:

transmit the control message further reserving a second set of resources for the UE to transmit the one or more reference signals for sidelink positioning on at least one resource of the set of resources and at least one resource of the second set of resources.

29. The apparatus of claim 25, wherein the instructions to transmit the control message are further executable by the one or more processors, individually or collectively, to cause the apparatus to:

transmit the control message identifying a period for the set of resources.

30. An apparatus for wireless communication at a first user equipment (UE), comprising:

one or more processors;
memory coupled with the one or more processors; and
instructions stored in the memory and executable by the one or more processors, individually or collectively, to cause the apparatus to:

receive a control message from a second UE in a second radio frequency spectrum band based at least in part on a first bandwidth for transmission of one or more reference signals being larger than a second bandwidth available in a second radio frequency spectrum band, the control message reserving a set of resources for the second UE to transmit the one or more reference signals in a shared radio frequency spectrum band in a time interval for sidelink positioning; and receive, from the second UE, the one or more reference signals on the set of resources based at least in part on receiving the control message reserving the set of resources.

* * * * *